(12) United States Patent
Lewis

(10) Patent No.: US 12,086,696 B2
(45) Date of Patent: *Sep. 10, 2024

(54) USING A RECURSIVE REINFORCEMENT MODEL TO DETERMINE AN AGENT ACTION

(71) Applicant: Microsoft Technology Licensing, LLC, Redmond, WA (US)

(72) Inventor: Richard Patrick Lewis, Lynnwoood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,695

(22) Filed: Oct. 31, 2022

(65) Prior Publication Data

US 2023/0052561 A1 Feb. 16, 2023

Related U.S. Application Data

(63) Continuation of application No. 16/706,561, filed on Dec. 6, 2019, now Pat. No. 11,514,363.

(51) Int. Cl.
*G06N 20/00* (2019.01)
*G06T 7/70* (2017.01)

(52) U.S. Cl.
CPC ............. *G06N 20/00* (2019.01); *G06T 7/70* (2017.01); *G06T 2207/10016* (2013.01); *G06T 2207/20081* (2013.01)

(58) Field of Classification Search
CPC ................. G06N 20/00; G06T 7/70; G06T 2207/10016; G06T 2207/20081
USPC ................................................. 706/12, 16, 21
See application file for complete search history.

(56) References Cited

U.S. PATENT DOCUMENTS

| | | | |
|---|---|---|---|
| 11,514,363 B2 * | 11/2022 | Lewis | B25J 9/163 |
| 2018/0165603 A1 * | 6/2018 | Van Seijen | G06N 3/045 |
| 2018/0300598 A1 * | 10/2018 | Crabtree | G06N 20/00 |

* cited by examiner

*Primary Examiner* — Quang N Vo
(74) *Attorney, Agent, or Firm* — Mannava & Kang, P.C.

(57) ABSTRACT

According to examples, an apparatus may include a processor and a memory on which is stored machine readable instructions that may cause the processor to access data about an environment of an agent, identify an actor in the environment, and access candidate models, in which each of the candidate models may predict a certain action of the identified actor. The instructions may also cause the processor to apply a selected candidate model of the accessed candidate models on the accessed data to determine a predicted action of the identified actor and may implement a recursive reinforcement learning model using the predicted action of the identified actor to determine an action that the agent is to perform. The instructions may further cause the processor to cause the agent to perform the determined action.

20 Claims, 8 Drawing Sheets

USING A RECURSIVE REINFORCEMENT MODEL TO DETERMINE AN AGENT ACTION

PRIORITY

This application is a Continuation of commonly assigned and co-pending U.S. patent application Ser. No. 16/706,561, filed on Dec. 6, 2019, the disclosure of which is hereby incorporated by reference in its entirety.

BACKGROUND

Autonomous devices may use or include computing systems to determine actions that the autonomous devices may perform. Some of the actions may include, for instance, navigating from one location to another, actuating a manipulator, maintaining a position of a vehicle within a lane along a road, and/or the like. In many instances, the computing systems may determine the actions to be actions that may prevent the autonomous devices from performing actions that may deviate from a specified set of operations.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
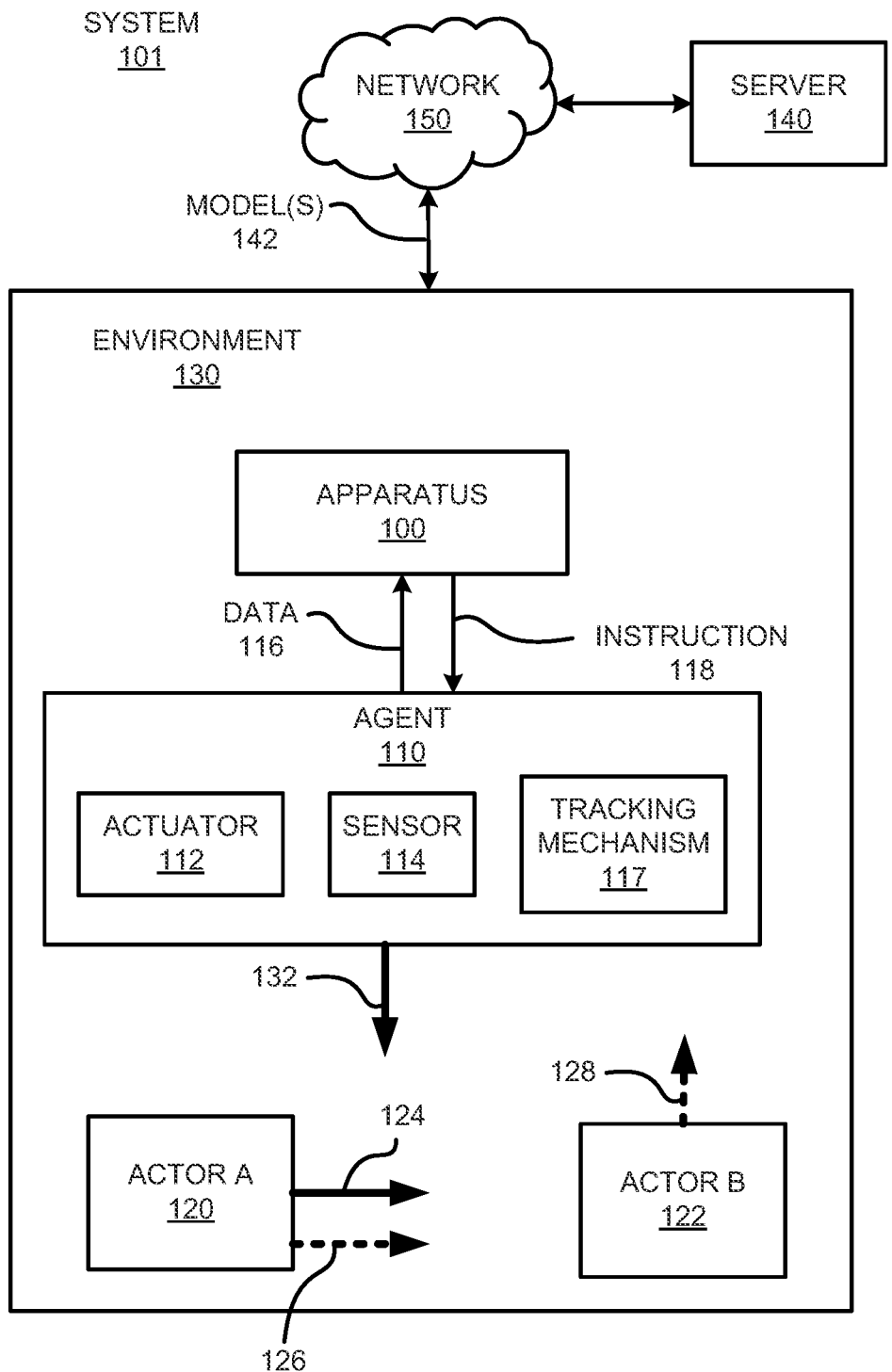
FIG. 1 shows a block diagram of a system that may include an apparatus, in which the apparatus may determine an action that an agent is to perform based on a predicted action of an actor in an environment of the agent, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable media in which a processor may implement a recursive reinforcement learning model to determine an action that an agent is to perform. Particularly, the processor may determine a predicted action of an actor identified in an environment of the agent and may implement the recursive reinforcement learning model to determine the action that the agent is to perform. In some examples, the processor may implement a machine learning model, e.g., a first order model, on the actor and the environment to determine the predicted action of the actor. The machine learning model may be a reinforcement learning model and the processor may determine the predicted action to be an action that may maximize a reward for the actor and/or minimize a penalty for the actor according to a reward/penalty policy for the actor. In addition, the processor may determine the action that the agent is to perform using the predicted action of the actor as a factor in the recursive reinforcement learning model. For instance, the processor may determine the action that the agent is to perform as an action that may maximize both the reward for the actor and a reward for the agent according to a reward policy and/or may minimize both a penalty for the actor and a penalty for the agent according to a penalty policy.

In some examples, the recursive reinforcement learning model may be a third order model. In these examples, the processor may determine a predicted action of a second actor using a first order reinforcement learning model and may use the predicted action of the second actor as a factor in a second order reinforcement learning model of a first actor. For instance, the processor may use the predicted action that results in a maximized reward for the second actor in determining a predicted action of the first actor. In addition, the processor may use the predicted action of the first actor in a third order model to determine the action that the agent is to perform.

According to examples, a server may generate the models that the processor may use to determine the predicted actions of the actors and the agents and may communicate the models to the processor. In addition, the processor may upload data corresponding to the predicted actions to the server and the server may update the models based on the uploaded data. As a result, the server may continuously update the models to thereby improve their accuracies.

Through implementation of the features of the present disclosure, a processor may accurately determine actions that an agent is to perform and may cause the agent to perform the determined actions. That is, for instance, the processor may determine actions that an agent is to perform that may prevent the agent from operating in a dangerous and/or unintended manner with respect to objects in an environment in which the agent is operating. As a result, the processor may cause the agent to perform actions that may be safe to the agent as well as to the actors in the environment of the agent. The processor may accurately determine the actions through implementation of recursive reinforcement learning models on actors in the environment as well as the agent. In addition, the processor may determine actions for the agent that may enable the agent to operate in an energy efficient manner, e.g., by determining actions that may reduce wasted movements of the agent as well as other actors in the environment.

Figure 2:
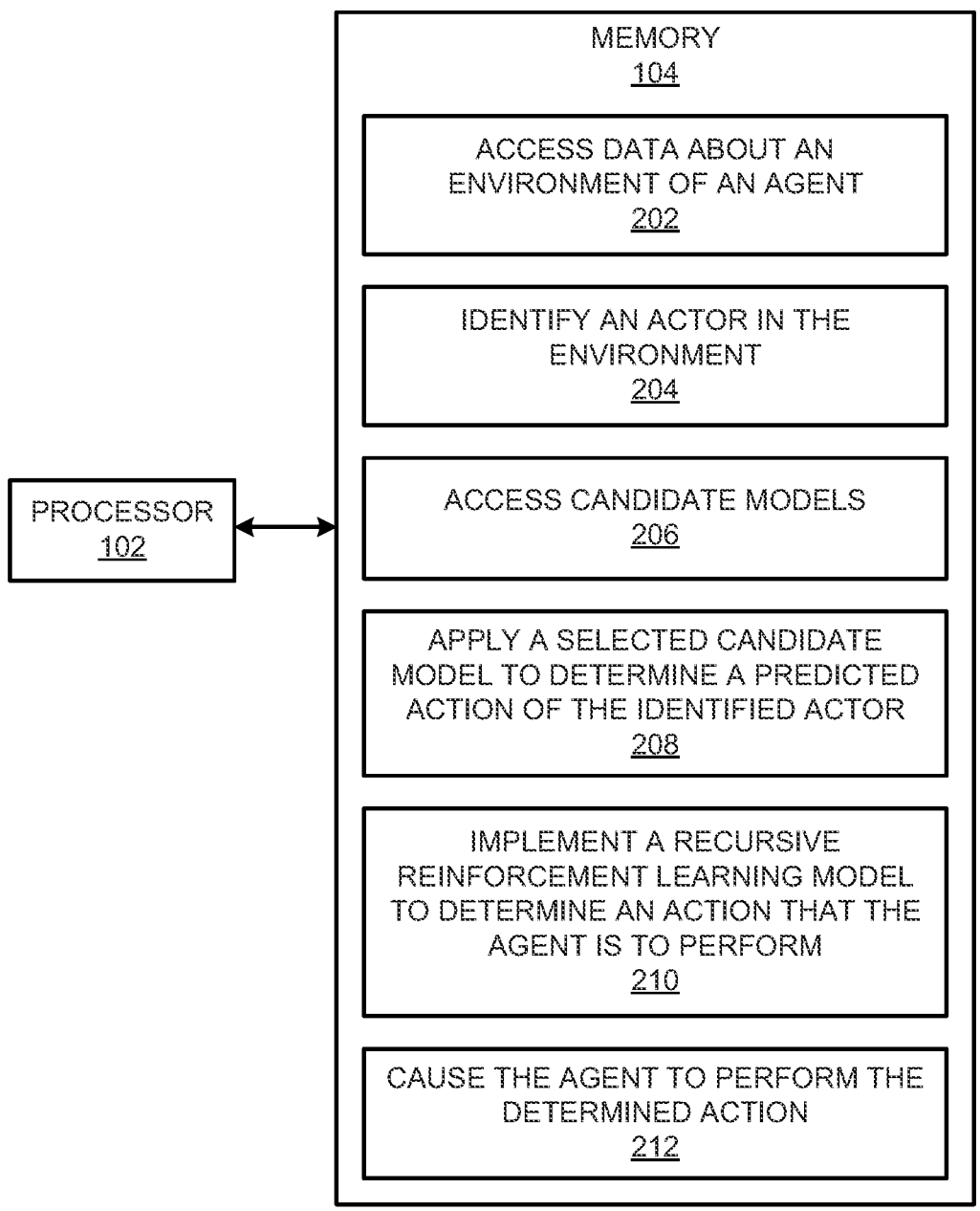
FIG. 2 shows a block diagram of the apparatus depicted in FIG. 1, in accordance with an embodiment of the present disclosure.

Reference is first made to FIGS. 1 and 2. FIG. 1 shows a block diagram of a system 101 that may include an apparatus 100, in which the apparatus 100 may determine an action that an agent 110 is to perform based on a predicted action of an actor 120 in an environment 130 of the agent 110, in accordance with an embodiment of the present disclosure. FIG. 2 shows a block diagram of the apparatus 100 depicted in FIG. 1, in accordance with an embodiment of the present disclosure. It should be understood that the apparatus 100 depicted in FIGS. 1 and 2 may include additional features and that some of the features described herein may be removed and/or modified without departing from the scope of the apparatus 100.

The apparatus 100 may be a computing device such as a laptop computer, a tablet computer, a smartphone, or the like, and may be separate from the agent 110. In other examples, the apparatus 100 may be a control system of the agent 110 and may thus be integrated with the agent 110. In any of these examples, the apparatus 100 may be mounted on or in the agent 110. In addition, the apparatus 100 may include a processor 102 that may control operations of various components of the apparatus 100 and a memory 104 on which data that the processor 102 may access and/or may execute may be stored.

The processor 102 may be a semiconductor-based microprocessor, a central processing unit (CPU), an application specific integrated circuit (ASIC), a field-programmable gate array (FPGA), and/or other hardware device. The memory 104, which may also be termed a computer-readable medium, may be, for example, a Random Access memory (RAM), an Electrically Erasable Programmable Read-Only Memory (EEPROM), a storage device, or the like. The memory 104 may be a non-transitory computer-readable storage medium, where the term "non-transitory" does not encompass transitory propagating signals. In any regard, the memory 104 may have stored thereon machine readable instructions that the processor 102 may execute to control various operations of the apparatus 100 and/or the agent 110.

Although the apparatus 100 is depicted as having a single processor 102, it should be understood that the apparatus 100 may include additional processors and/or cores without departing from a scope of the apparatus 100. In this regard, references to a single processor 102 as well as to a single memory 104 may be understood to additionally or alternatively pertain to multiple processors 102 and multiple memories 104. In addition, or alternatively, the processor 102 and the memory 104 may be integrated into a single component, e.g., an integrated circuit on which both the processor 102 and the memory 104 may be provided.

According to examples, the agent 110 may be a physical device that may autonomously maneuver itself (e.g., under the direction of the processor 102) in the environment 130, e.g., a robot, an automobile, an aircraft, and/or the like. That is, the agent 110 may be an autonomous device that may move in various directions and/or may include components, e.g., arms, graspers, manipulators, and/or the like, in which movements of the agent 110 and/or components of the agent 110 may occur without receipt of user instructions to do so (under the direction of the processor 102). As shown, the agent 110 may include an actuator 112 that may be actuated to move the agent 110 and/or components of the agent 110. The actuator 112 may be a motor or other device that may drive wheels on the agent 110, that may manipulate an arm on the agent 110, that may activate an indicator, and/or the like. In any regard, and as discussed herein, the processor 102 may determine an action that the agent 110 is to perform based on a predicted action of actors 120, 122 in the environment 130 as well as other data in and/or about the environment 130.

By way of example, the agent 110 (along with the processor 102) may be an autonomous vehicle, an autonomous land-based robot, an autonomous flying vehicle, an autonomous water-based robot, and/or the like. In particular examples, the agent 110 may be a self-driving car, a robot in a warehouse, a drone, etc. As discussed herein, the processor 102 of the apparatus 100, which may be integrated with the agent 110, may make decisions as to how the agent 110 may operate, e.g., the actions that the agent 110 may perform based on conditions of the environment 130 in which the agent 110 is operating. The environment 130 may be an area in which the agent 110 may operate and may include various objects with which the agent 110 interact. By way of example, the environment 130 may be a road along which the agent 110 is travelling and an area around the road, a warehouse in which the agent 110 is operating, a building in which the agent 110 is operating, an aerial space around the agent 110, and/or the like. The environment 130 may additionally be any other area in which the agent 110 may operate or may currently be operating.

The agent 110 may further include a sensor 114 that may track objects in the environment 130. In some examples, the sensor 114 may be a camera or a plurality of cameras that may capture images, e.g., videos, of the environment 130. In addition or in other examples, the sensor 114 may be a radar-based sensor that may track the locations and distances of objects in the environment 130 with respect to the agent 110. For instance, the sensor 114 may be a sonar-based sensor, a radar-based sensor, a light detection and ranging (LIDAR) based sensor, and/or the like.

According to examples, the processor 102 may determine, from the data 116 collected by the sensor 114, objects, e.g., actors 120, 122, along with their respective locations and/or movements. That is, for instance, the processor 102 may implement an object recognition program that may identify objects in the captured images and may also determine the locations and/or distances of the objects with respect to the agent 110. In some examples, the processor 102 may distinguish the objects in the captured images that are moving and/or are able to move from other objects, such as, objects that are fixed and/or are not likely to move. In addition, the processor 102 may identify the objects that are moving and/or are able to move as actors 120, 122. In other words, the processor 102 may identify as objects, e.g., entities, that may have intension, e.g., the actor 120, 122 may have an intention to perform an operation, and agency, e.g., the actor 120, 122 may take an action.

Examples of objects that are fixed and/or not likely to move may include, for instance, street signs, trees, rocks, shelves, walls, buildings, or the like. Examples of objects that are moving and/or are able to move, which are referenced herein as the actors 120, 122, may be vehicles, robots, drones, etc., and/or other mobile entities, such as people, animals, scooters, bicycles, etc. In some examples, the processor 102 may determine that an object is moving in instances in which a position of the object changes in multiple images. The processor 102 may also predict the motion of an object, e.g., that the object is predicted to continue to move in a particular direction, following movement of the object outside of the view of the sensor 114.

In some examples, the processor 102 may identify actors 120, 122 as objects that move between frames of images that the sensor 114 may have captured and/or are predicted to move between the frames and/or in future frames. The processor 102 may also identify an object which appears stationary to be an actor 120 from learned data, e.g., the processor 102 may identify an automobile or a person that is currently stationary as an actor 120. The processor 102 may dynamically identify novel objects, e.g., an object that the processor 102 may not have seen before, as an actor 120 based on behavior of the object. For instance, the processor 102 may distinguish between inanimate objects and objects that may be intelligently controlled based on the manners in which the objects may be moving. For instance, an inanimate object may move along a straight line, e.g., a baseball, whereas an intelligently controlled object, e.g., a bird, may perform independent actions such as stopping and then moving, turning, etc.

The agent 110 may also include a tracking mechanism 117 that may include components for tracking the spatial location of the agent 110, e.g., within the environment 130. For instance, the tracking mechanism 117 may include an accelerometer that may detect accelerations of the agent 110 and a gyroscope that may detect rotational movements of the agent 110. The tracking mechanism 117 may also include global position system (GPS) components that may track a geographic position of the agent 110. In examples, the processor 102 may determine the spatial location of the agent 110, the direction at which the agent 110 is facing, as well as the direction in which agent 110 is moving from data identified by the tracking mechanism 117.

Although not shown in FIG. 1, the agent 110 may include other components such as a microphone to capture audio, a speaker to output audio, a receptacle to receive a battery, a wireless transceiver, and/or the like. The agent 110 may also include a display, lights, and/or other types of visual indicators.

In addition, or in other examples, the agent 110 may be a virtual agent, for example, an artificial intelligence program that may operate in a virtual environment such as a video game, a collaborative workspace, a social media platform, and/or the like. In these examples, the agent 110 may virtually track other actors 120, 122 in the virtual environment and the processor 102 may determine actions that the actors 120, 122 in the virtual environment may be predicted to perform as discussed herein. Additionally, the processor 102 may determine an action that the agent 110 is to perform based on the predicted actions that the actors 120, 122 in the virtual environment are predicted to perform.

As shown in FIG. 2, the memory 104 may have stored thereon machine-readable instructions 202-212 that the processor 102 may execute. Although the instructions 202-212 are described herein as being stored on a memory and may thus include a set of machine readable instructions, the apparatus 100 may include hardware logic blocks that may perform functions similar to the instructions 202-212. For instance, the processor 102 may include hardware components that may execute the instructions 202-212. In other examples, the apparatus 100 may include a combination of instructions and hardware logic blocks to implement or execute functions corresponding to the instructions 202-212. In any of these examples, the processor 102 may implement the hardware logic blocks and/or execute the instructions 202-212. As discussed herein, the apparatus 100 may also include additional instructions and/or hardware logic blocks such that the processor 102 may execute operations in addition to or in place of those discussed above with respect to FIG. 2.

The processor 102 may execute the instructions 202 to access data 116 about an environment 130 of an agent 110. The data 116 may include information pertaining to the agent 110 and the actors 120, 122 in the environment 130. The information pertaining to the agent 110 may include current geographical information, directional information, movement information, etc., of the agent 110. The information pertaining to the actors 120, 122 may be images of the actors 120, 122, identification of the actors 120, 122, current positions of the actors 120, 122 with respect to the agent 110, current movement of the actors 120, 122, etc. For instance, the data 116 may indicate that a first actor 120 may currently be moving in a direction and speed denoted by the arrow 124 while a second actor 122 may currently be stationary.

The processor 102 may execute the instructions 204 to identify an actor 120 in the environment 130. Particularly, the processor 102 may identify an actor 120 that is currently moving and/or may move within a predefined period of time, e.g., within a window of time during which the agent 110 is within the environment in which the actor 120 is located. As such, for instance, the processor 102 may distinguish between objects in the environment 130 that may be fixed and thus may not likely be movable within the predefined period of time in from the actors 120, 122 that may be predicted to likely move within the predefined period of time. As discussed herein, the processor 102 may predict the actions of the actors 120, 122 and may use the predictions of the actions of the actors 120, 122 in determining an action that the agent 110 is to perform. Although particular reference is made to two actors 120, 122, it should be understood that features of the present disclosure may be expanded to any number of additional actors in the environment 130. Thus, for instance, the processor 102 may predict the actions of each of the actors in the environment and may use the predictions of the actions of the actors in determining an action that the agent 110 is to perform.

According to examples, the processor 102 may access images captured by the sensor 114 around the agent 110 and may determine the environment 130 of the agent 110 from the images. The sensor 114, which may be a camera or multiple cameras on the agent 110, may capture the images and the agent 110 may communicate the images, e.g., as data 116, to the processor 102. In addition, the processor 102 may analyze the accessed images to identify features in the environment 130 including a landscape of the environment 130, as well as objects and the actors 120, 122 in the environment 130. For instance, the processor 102 may employ an object recognition model to identify objects in the accessed images and to also identify the actor 120 as being one of the identified objects. The object recognition model may be programmed to distinguish between multiple types of objects and the processor 102 may employ the object recognition model to determine the types of objects that are included in the captured images.

The processor 102 may employ the object recognition model to determine one of the identified objects that is currently moving and/or may likely move as an actor 120. The processor 102 may also determine what the actor 120 is from execution of the object recognition model, e.g., whether the actor 120 is a car, a person on a bicycle, a person on a street, an animal, or the like.

The processor 102 may execute the instructions 206 to access candidate models 142, in which each of the candidate models 142 may predict a certain behavior of the identified actor 120. In some examples, the processor 102 may communicate a request to the server 140 for the candidate models 142, in which the request may include an identification of what the actor 120 is, e.g., that the actor 120 is a car, a person, or the like. In response, the processor 102 may select a plurality of candidate models 142 from a number of models stored on the server 140 or in a storage accessible by the server 140, that may correspond to the identified type of the actor 120. Each of the candidate models 142 may predict a particular behavior of the identified actor 120. The processor 102 may also communicate the selected candidate models 142 to the processor 102.

According to examples, the processor 102 may access a lookup table that may include a listing of actor types and the models that correspond to the actor types to select the plurality of candidate models 142. Although in other examples, the processor 102 may select the candidate models 142 in other manners. In some examples, the server 140 may generate, develop, train, etc., the candidate models 142 of the actor 120 from, for instance, data collected from the actor 120 as well as data collected from other sources and may use the data to train the models. The server 140 may generate, e.g., train, the candidate models 142, which may be machine learning models, based on multiple inputs and outputs corresponding to the actor 120. For instance, the server 140 may collect data pertaining the actor 120 type from the apparatus 100 and/or other sources. The data may include actions that the actor 120 performed based on various types of inputs and the types of environments 130 in which the actor 120 was positioned. In any regard, the server 140 may use any suitable machine learning processes to train the candidate models 142.

By way of particular example in which the actor 120 is an automobile, the server 140 may train a first candidate model 142 with a first input in which the automobile is in a right lane at a traffic light and the automobile made a right turn. The server 140 may also train a second candidate model 142 with a second input in which the automobile is in a center lane at a traffic light and the automobile when straight. The server 140 may further train additional candidate models 142 with other types of inputs and actions that the automobile performed. Thus, for instance, the candidate models 142 in these examples may be used to determine which direction an automobile may go based on the lane in which the automobile is located. The server 140 may train additional candidate models 142 for automobiles as well as for other types of actors using types of inputs suitable for the types of actors. By way of another example in which the actor 120 is a person, the server 140 may train the candidate models 142 for the person using various types of input, such as, whether the user is at a cross walk, in the middle of the street, next to a vehicle, etc., and the actions corresponding to those inputs.

The server 140 may generate models for a plurality of different types of actors 120 and may update the models as additional training data is collected. In some examples, the processor 102 may request, e.g., submit a query for, the model for the actor 120 from the server 140 after the processor 102 has identified the actor 120. In response, the server 140 may identify the model for the actor 120 and may communicate the model to the processor 102 via the network 150, which may be the Internet, a local area network, a cellular network, a combination thereof, and/or the like. According to examples, a computing device or server other than the server 140 may generate the models for the various actor types. In these examples, the server 140 may access the generated models from the other computing device or other server in selecting the candidate models 142 to send to the apparatus 100.

The processor 102 may access a variety of behavioral templates that may be available for the actor 120, in which each of the behavioral templates is a different model. Each of the models may predict different types of behavior, different goals or reward policies, different amounts of sophistication, and/or the like. The processor 102 may examine a history of behavior and may predict the behavior given each of the variety of behavioral templates, and may then apply the template (model) that best fits the behavior.

The processor 102 may also be equipped with a cloud-based learning model. In this case, the processor 102 (or a plurality of processors connected to the same cloud) may accumulate a large amount of behavioral data for many types of actors 120, 122 that the processor 102 may encounter. The cloud-based learning model may keep trying different models to refine the behavioral model for each class of actor 120, 122, and those models may then be offered during inferencing to identify which one fits the best. In other words, the cloud-based learning model may be construed as an evolutionary learning model.

The processor 102 may execute the instructions 208 to apply a selected candidate model of the accessed candidate models 142 on the accessed data to determine a predicted action of the identified actor 120. The processor 102 may select one of the accessed candidate models 142 to apply on the accessed data based on, for instance, which of accessed candidate models 142 most closely matches the accessed data. That is, for instance, the processor 102 may compare elements of the accessed data, e.g., the location of the actor 120, the type of the actor 120, the direction in which the actor 120 is currently moving, whether a turn signal of the actor 120 is active, a current time of day, a current day of the week, whether another actor 122 is in the environment 130, and/or the like, with respective inputs of the accessed candidate models 142 to determine which of the candidate models 142 have inputs that match the most number of the elements of the accessed data among the candidate models 142. The processor 102 may select the candidate model 142 that has inputs that match the most number of the elements among the candidate models 142.

In addition, or in other examples, the elements of the accessed data may be weighted according to respective importance levels assigned to the elements. For instance, the direction in which the actor 120 is currently moving may be weighted higher than the time of day. In these examples, the processor 102 may determine which of the candidate models 142 have inputs that match the elements having the highest importance levels. That is, the processor 102 may assign numeric values to the elements according to their importance levels and may determine values of the candidate models 142 based on a summation (or other mathematical function) of the numeric values corresponding to the elements that match the inputs of the candidate models 142. In addition, the processor 102 may select the candidate model 142 having the highest value to determine the predicted action of the identified actor 120. The processor 102 may select the candidate model 142 using any other suitable method.

In any of the examples discussed herein, the processor 102 may determine that multiple candidate models 142 may be selected for use in determining the predicted action of the identified actor 120 when, for instance, the multiple candidate models 142 have inputs that are equal to each other with respect to matching the elements of the accessed data. In these instances, the processor 102 may select one of the multiple candidate models 142 based on any suitable criteria. For instance, the candidate models 142 may each be assigned a rating based on the respective accuracies of the candidate models 142, the respective popularities of the candidate models 142, the ages of the candidate models 142, the lengths of time since the candidate models 142 were created and/or updated, and/or the like. In addition, the processor 102 may select the candidate model 142 having the highest rating.

In other examples, the processor 102 may implement each of the candidate models 142 to determine respective predicted actions of the identified actor 120 corresponding to each of the candidate models 142. In addition, the processor 102 may determine that the identified actor 120 may be predicted to perform each of the predicted actions.

The selected candidate model for the identified actor 120 may be considered as a first order model in that the selected candidate model may pertain directly to the identified actor 120 without considering a model for a second actor 122 or the agent 110. According to examples, the selected candidate model may be a first order reinforcement learning model as shown in FIG. 3A, which depicts a diagram 300 of a first order reinforcement learning model for the actor 120 according to an embodiment of the present disclosure.

Figure 3A:
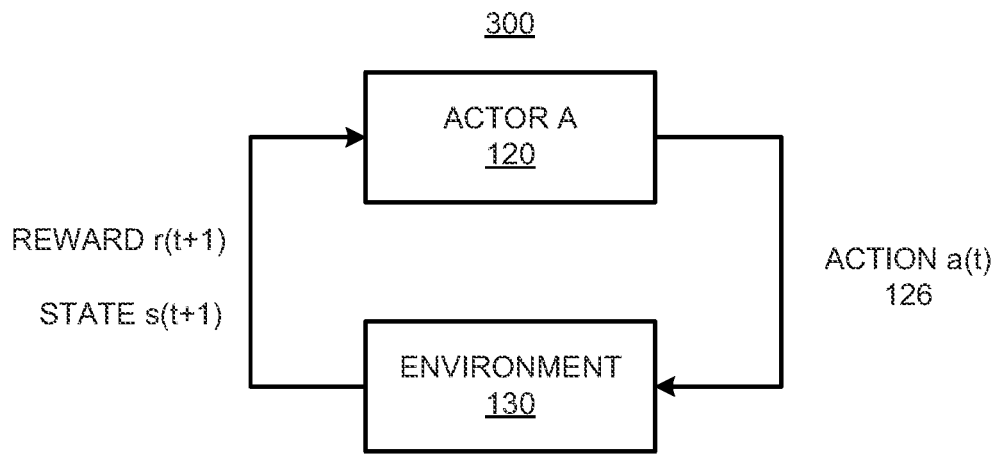
FIG. 3A shows a diagram of a first order reinforcement learning model for the actor shown in FIG. 1, in accordance with an embodiment of the present disclosure.

As shown in FIG. 3A, the first order reinforcement learning model for the actor 120 may take as inputs, the environment 130 and a reward at time (t−1) and may return an action (a) at time (t). The action (a(t)) may be provided to the environment 130, which may produce the state (s) and the reward (r) at time (t+1). The processor 102 may determine that the actor 120 may interact with its environment 130 in discrete time steps. The processor 102 may also determine the predicted actions of the actor 120 from a set of available actions as defined by the selected candidate model with the predicted action corresponding to, for instance, the reward (r) having the highest value. In other words, the processor 102 may determine the predicted action that optimizes, e.g., maximizes, the reward according to a reward policy. The reward policy may assign respective rewards to the predicted actions and the processor 102 may select the candidate model that results in the predicted action having the highest reward. In any regard, the processor 102 may determine a predicted action of the actor 120, e.g., as shown as dashed arrow 126 in FIG. 1.

Figure 3B:
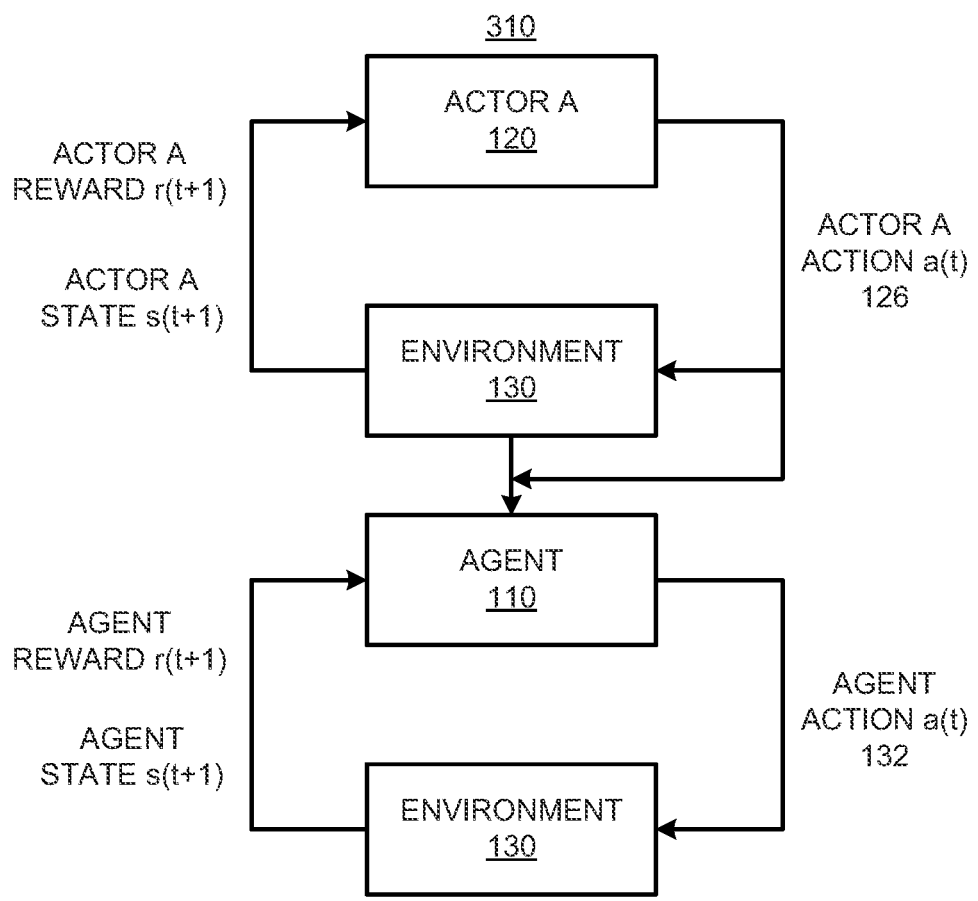
FIG. 3B shows a diagram of a (recursive) second order reinforcement learning model for the actor shown in FIG. 1, in accordance with an embodiment of the present disclosure.

The processor 102 may execute the instructions 210 to implement a recursive reinforcement learning model using the predicted action of the identified actor 120 to determine an action that the agent 110 is to perform. That is, the processor 102 may implement a second order reinforcement learning model to determine the action that the agent 110 is to perform. FIG. 3B shows an example diagram 310 of a recursive (e.g., second order) reinforcement learning model according to an embodiment of the present disclosure. In other examples, and as discussed herein, the recursive reinforcement learning model may be a third order reinforcement learning model or an even higher order reinforcement learning model. Recursive reinforcement learning may be defined as a technique where reinforcement learning may be applied recursively on a reinforcement learning model. That is, each layer in the reinforcement learning model may be applied recursively to a higher order layer, so that the higher order models may use a reinforcement learning model to predict the behavior of other actors 120, 122 (modeled using reinforcement learning) in the environment 130, to improve the predictive power of the processor's 102 internal model so that the processor's 102 policy may determine predicted actions that may ultimately yield higher rewards.

As shown in FIG. 3B, the processor 102 may make a prediction about the expected reward for the actor 120 in the environment 130, e.g., may estimate the actor's 120 goals. In this regard, the processor 102 may not explicitly receive from the actor 120 or a controller of the actor 120, information pertaining to the actor's goals or the expected reward. Once the processor 102 has assigned a prediction for the reward for the actor 120, the processor 102 may modify the agent reward to align with the predicted reward for the actor 120. For instance, the processor 102 may create empathy by adding the predicted reward for the actor 120 to the reward for the agent 110. Alternatively, the processor 102 may create sympathy in which the processor 102 may determine an action for the agent 110 that may simply try to not reduce the reward for the actor 120. In other words, the recursive reinforcement learning model may be programmed to cooperate with other actors 120, 122, to anticipate their goals, and facilitate achieving those goals. In some examples, the processor 102 may determine the action that optimizes, e.g., maximizes, the reward for the agent 110 according to a reward policy.

Although not shown, the processor 102 may make predictions about actions by each of the actors 120, 122 in the environment 130. In these examples, the processor 102 may apply separate recursive reinforcement learning models for each of the first order models applied to the actors 120, 122. As a result, for instance, the processor 102 may predict that the first actor 120 will move in the direction denoted by the arrow 126 and that the second actor 122 will move in the direction denoted by the arrow 128 at a time (t+1). In addition, the processor 102 may determine an action, e.g., movement as denoted by the arrow 132, that the agent 110 is to perform based on the predicted movements of both of the actors 120, 122. The processor 102 may also factor other considerations such as other objects in the environment 130 that may be in the path of the agent 110 or may other affect the movement of the agent 110.

In some examples, the processor 102 may, in making predictions about actions by the actor 120, determine that the actor 120 may be unable to see or is unaware of the location and/or action of the second actor 122, e.g., the processor 102 may determine that the location and/or action of the second actor 122 is unavailable to the actor 120. In some instances, the action of the second actor 122 may not currently be visible to the actor 120 and the action may impact an action of the actor 120 and/or the agent 110. However, the processor 102 may determine that the second actor 122 is predicted to perform an action that may impact the actor 120. In addition, the processor 102 may perform an action 132 that may inform the actor 120 of the action that the second actor 122. By way of particular example in which the agent 110 is an autonomous vehicle, the processor 102 may determine that the agent 110 may see a pedestrian (second actor 122) crossing a street, but in a location where another vehicle (actor 120) may not see the pedestrian, and the processor 102 may predict that the other vehicle does not see the pedestrian. In addition, the processor 102 may cause the agent 110 to perform an action such as, for instance, taking an appropriate evasive action, sounding an alarm, honking a horn, and/or the like.

Figure 3C:
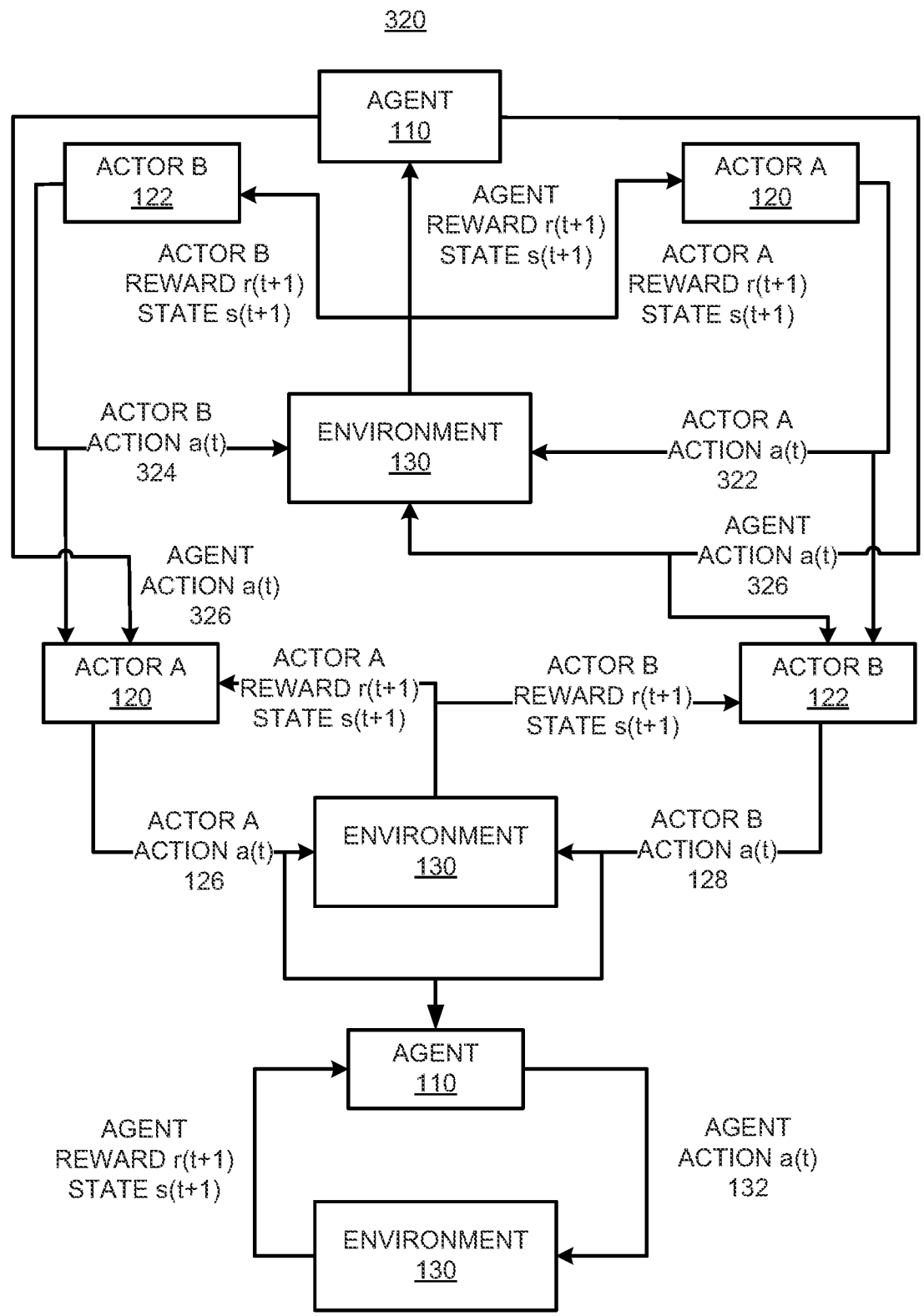
FIG. 3C shows a diagram of a (recursive) third order reinforcement learning model for the agent shown in FIG. 1, in accordance with an embodiment of the present disclosure.

According to examples, the processor 102 may implement a recursive reinforcement learning model that is a third order reinforcement learning model to determine the action that the agent 110 is to perform. A diagram 320 of a third order reinforcement learning model according to an embodiment of the present disclosure is depicted in FIG. 3C. As shown in FIG. 3C, the processor 102 may determine a first order predicted action 322 of a first actor 120, a first order predicted action 324 of a second actor 120, and a first order predicted action 326 of the agent 110, for instance, through implementation of respective first reinforcement learning models on the first actor 120, the second actor 122, and the agent 110. The processor 102 may identify the first actor 120 and may determine the first order predicted action 322 of the first actor 120 in any of the manners discussed above. Similarly, the processor 102 may identify the second actor 122 in the environment 130 from the accessed data and may access second candidate models 142 of the second actor 122, e.g., from the server 140. The processor 102 may select a model for the second actor 122 in a manner similar to those discussed above with respect to the first actor 120.

In addition, the processor 102 may apply a second candidate model of the second candidate models 142 to determine the first order predicted action 324 of the second actor 122. That is, the processor 102 may apply reinforcement learning on the selected model in a manner similar to any of the manners discussed above with respect to the actor 120 to determine the first order predicted action 324 of the second actor 122. Thus, for instance, the processor 102 may determine the first order predicted action 324 of the second actor 122 through application of the second candidate model and an analysis of the accessed data about the environment 130. That is, the processor 102 may use the accessed data about the environment 130 as inputs into the second candidate model to determine a plurality of predicted actions of the second actor 122 resulting from the inputs. The processor 102 may further select the first order predicted action 324 that optimizes, e.g., maximizes, the reward for the second actor 122. The processor 102 may also determine the first order predicted action 326 of the agent 110 in similar manners while also factoring the first order predicted action 322 of the first actor 120 and the first order predicted action 324 of the second actor 122 as shown in FIG. 3C.

In these examples, and as shown in FIG. 3C, the processor 102 may apply a recursive reinforcement learning model, for instance, by using the first order predicted action 326 of the agent 110 and the first order predicted action 324 of the second actor 122 as inputs in determining a second order predicted action 126 of the first actor 120. That is, the processor 102 may use the first order predicted action 326 of the agent 110 and the first order predicted action 324 of the second actor 122 as factors in determining the second order predicted action 126 of the first actor 120. For instance, once the processor 102 has assigned predictions for second order rewards for the second actor 122 and the agent 110, the processor 102 may modify the second order reward of the first actor 120 to align with the second order predicted rewards for the second actor 122 and the agent 110. By way of example, the processor 102 may create empathy by adding the predicted rewards for the second actor 122 and the agent 110 to the reward for the first actor 120. Alternatively, the processor 102 may create sympathy in which the processor 102 may determine a second order predicted action 126 for the first actor 120 that may simply try to not reduce the predicted rewards for the second actor 122 and/or the agent 110. In other words, the recursive reinforcement learning model for the first actor 120 may be programmed to cooperate with the second actor 122 and the agent 110 to anticipate the goals of the second actor 122 and the agent 110, and facilitate achieving those goals.

As also shown in FIG. 3C, the processor 102 may apply a recursive reinforcement learning model, for instance, by using the first order predicted action 326 of the agent 110 and the first order predicted action 322 of the first actor 120 as inputs in determining a second order predicted action 128 of the second actor 122. That is, the processor 102 may use the first order predicted action 326 of the agent 110 and the first order predicted action 322 of the first actor 120 as factors in determining the second order predicted action 128 of the second actor 122. For instance, once the processor 102 has assigned predictions for second order rewards for the first actor 120 and the agent 110, the processor 102 may modify the second order reward of the second actor 122 to align with the second order predicted rewards for the first actor 120 and the agent 110. By way of example, the processor 102 may create empathy by adding the predicted rewards for the first actor 120 and the agent 110 to the reward for the second actor 122. Alternatively, the processor 102 may create sympathy in which the processor 102 may determine a second order predicted action 128 for the second actor 122 that may try to not reduce the predicted rewards for the first actor 120 and/or the agent 110. In other words, the recursive reinforcement learning model for the second actor 122 may be programmed to cooperate with the first actor 120 and the agent 110 to anticipate the goals of the first actor 120 and the agent 110, and facilitate achieving those goals.

As discussed above, the processor 102 may determine the second order predicted action 126 of the first actor 120 using a second order reinforcement learning model in which the first order predicted action 324 of the second actor 122 and the first order predicted action 326 of the agent 110 may be used in the prediction for the reward for the second order predicted action 126 of the first actor 120. Thus, for instance, the processor 102 may determine the second order predicted action 126 of the first actor 120 through application of the selected candidate model and an analysis of the accessed data about the environment 130. That is, the processor 102 may use the accessed data about the environment 130 as inputs into the selected candidate model to determine a plurality of predicted actions of the first actor 120 resulting from the inputs. The processor 102 may further select the second order predicted action 126 that optimizes the reward for the first actor 120.

The processor 102 may also determine the second order predicted action 128 of the second actor 122 using a second order reinforcement learning model in which the first order predicted action 324 of the first actor 120 and the first order predicted action 326 of the agent 110 may be used in the prediction for the reward for the second order predicted action 128 of the second actor 122. Thus, for instance, the processor 102 may determine the second order predicted action 128 of the second actor 122 through application of the selected candidate model and an analysis of the accessed data about the environment 130. That is, the processor 102 may use the accessed data about the environment 130 as inputs into the selected candidate model to determine a plurality of predicted actions of the second actor 122 resulting from the inputs. The processor 102 may further select the second order predicted action 128 that optimizes the reward for the second actor 122.

In addition, as shown in FIG. 3C, the processor 102 may determine a third order predicted action 132 that the agent 110 is to perform using a third order reinforcement learning model in which the second order predicted action 126 of the first actor 120 and the second order predicted action 128 of the second actor 122 may be used in the prediction for the reward for the third order predicted action 132 of the agent 110. The processor 102 may determine the third order predicted action 132 in any of the manners discussed herein with respect to FIG. 3B. Thus, for instance, the processor 102 may determine the third order predicted action 132 using the second order predicted action 126 of the first actor 120 and the second order predicted action 128 of the second actor 122, in which each of the second order predicted actions 126, 128 may have been determined using the first order predicted actions 322, 324, 326 of the first actor 120, the second actor 122, and the agent 110.

According to examples, the processor 102 may determine the third order predicted action 132 of the agent 110 through application of the third order reinforcement learning model and an analysis of the accessed data about the environment 130. That is, the processor 102 may use the accessed data about the environment 130 as inputs into the third order reinforcement learning model to determine a plurality of predicted actions of the agent 110 resulting from the inputs. The processor 102 may further select the third order predicted action 132 that optimizes the reward for the agent 110. In some examples, the processor 102 may use fuzzing and/or simulations, e.g., Monte Carlo simulations, to analyze the outcomes of multiple candidate actions of the agent 110 and may predict the outcomes over a short time in the future. In these examples, the processor 102 may select the action 132 that is predicted to result in an optimal result, e.g., that results in the highest reward for the agent 110.

According to examples, the processor 102 may upload the determined action 132 that the agent 110 is to perform to a server, e.g., the server 140, via the network 150. In these examples, the server 140 may update the third order model that the processor 102 used to determine the action 132 to incorporate the action 132. That is, for instance, the third order model may be a machine learning model and the server 140 may train the third order model with the action 132 as an output of the third order model. The processor 102 may also upload the candidate models that the processor 102 used to determine the predicted actions 126, 128 of the actors 120, 122 to the server 140 and the server 140 may update the candidate models 142 of the actors 120, 122 based on the predicted actions 126, 128. That is, the server 140 may use the predicted actions 126, 128 as respective outputs to the candidate models 142 in training the candidate models 142.

The processor 102 may execute the instructions 212 to cause, e.g., instruct, the agent 110 to perform the determined action 132. In examples in which the processor 102 is integrated with the agent 110, the processor 102 may control the agent 110 to perform the determined action 132. In examples in which the processor 102 is separate from the agent 110, the processor 102 may communicate an instruction to the agent 110 to perform the determined action 132.

The processor 102 may further continue to track the actions of the actors 120, 122 and may upload information pertaining to the tracked actions to the server 140. The server 140 may use the uploaded information to update the models 142 of the actors 120, 122. The server 140 may also receive other information pertaining to the tracked actions of the actors 120, 122 from the actors 120, 122 as well as from other actors and may use the other information to update the models. In any of these examples, the server 140 may continuously update the models 142, may update the models 142 ate various intervals of time, or the like. As a result, the models 142 may continuously be updated to more accurately predict actions that the actors 120, 122 may perform.

Figure 4:
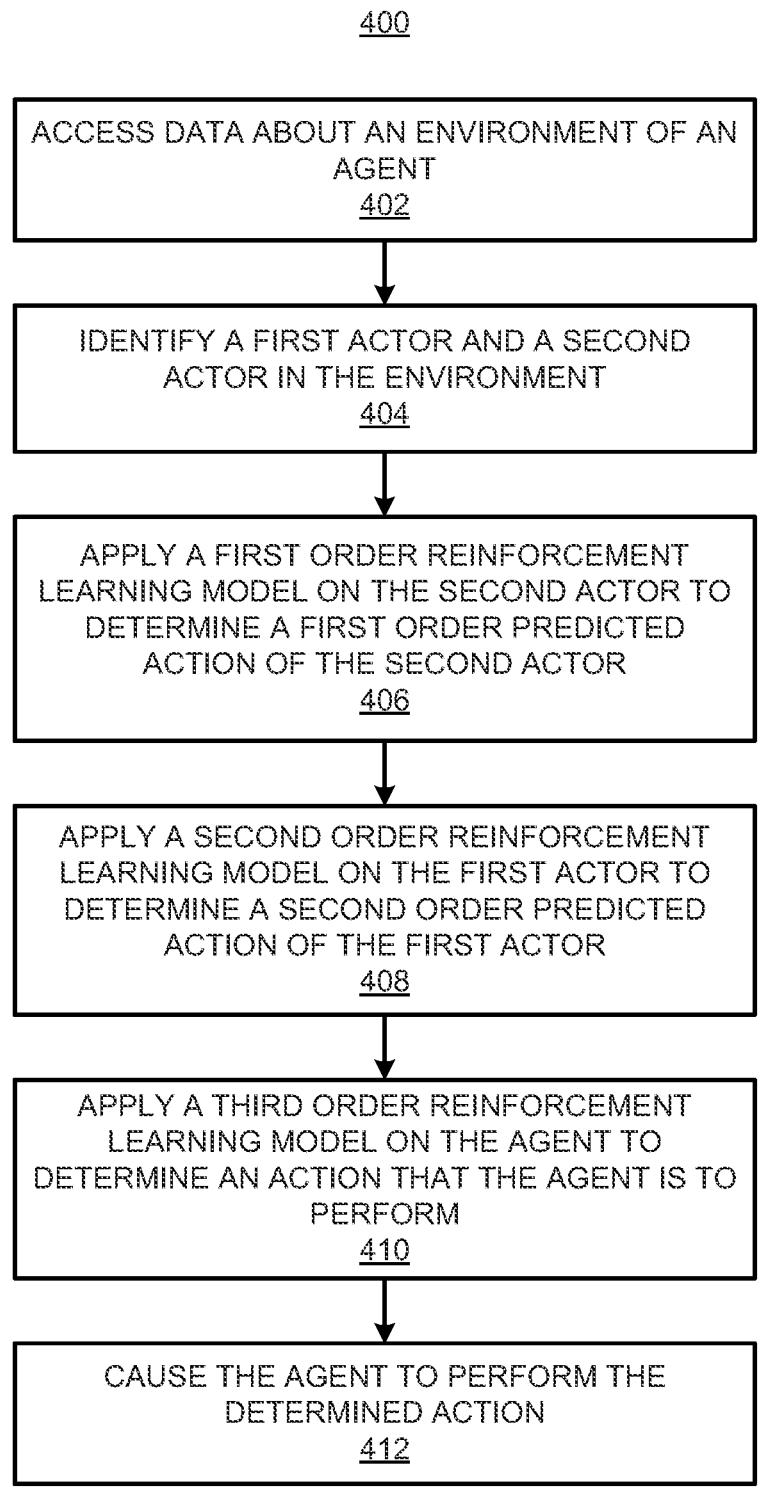
FIGS. 4 and 5, respectively, depict flow diagrams of methods for applying a third order reinforcement learning model to determine an action that an agent is to perform, in accordance with embodiments of the present disclosure.
Figure 5:
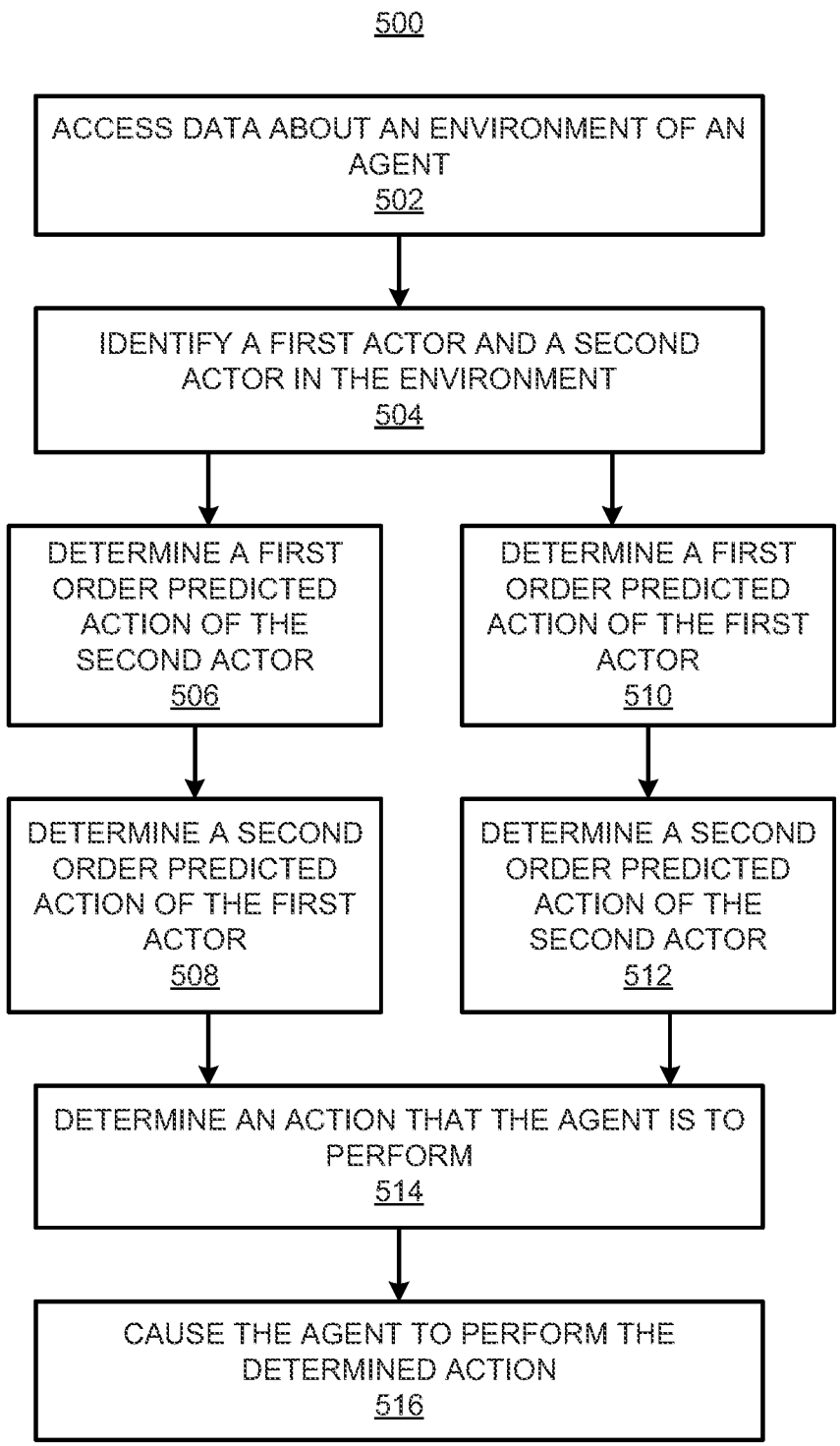

Various manners in which the processor 102 of the apparatus 100 may operate are discussed in greater detail with respect to the methods 400 and 500 respectively depicted in FIGS. 4 and 5. Particularly, FIGS. 4 and 5, respectively depict flow diagrams of methods 400 and 500 for applying a third order reinforcement learning model to determine an action that an agent 110 is to perform, in accordance with embodiments of the present disclosure. It should be understood that the methods 400 and 500 respectively depicted in FIGS. 4 and 5 may include additional operations and that some of the operations described therein may be removed and/or modified without departing from the scopes of the methods 400 and 500. The descriptions of the methods 400 and 500 are made with reference to the features depicted in FIGS. 1-3C for purposes of illustration.

With reference first to FIG. 4, at block 402, the processor 102 may access data about an environment 130 of an agent 110. As discussed herein, the agent 110 may include a sensor 114, e.g., a camera, that may capture images and/or video of the environment 130 in which the agent 110 is located. In these examples, the processor 102 may access captured images of the environment 130.

At block 404, the processor 102 may identify a first actor 120 and a second actor 122 in the environment 130. For instance, the processor 102 may identify the first actor 120 and the second actor 122 through application of an object recognition program on the captured images and/or video as discussed herein. Although particular reference is made to a first actor 120 and a second actor 122 being identified from the accessed data, it should be understood that additional actors may also be identified.

At block 406, the processor 102 may apply a first order reinforcement learning model on the second actor 122 to determine a first order predicted action 324 of the second actor 122. The processor 102 may determine the first order predicted action 324 through implementation of a selected candidate model as discussed herein. For instance, the processor 102 may determine the first order predicted action 324 of the second actor 122 by determining the first order predicted action 324 to be an action that optimizes a reward determined through application of the first order reinforcement learning and an analysis of the accessed data about the environment 130. In addition, the processor 102 may determine the first order predicted action 324 of the second actor 122 by determining the first order predicted action 324 through analysis of a predicted action of the first actor 120 and the agent 110 from the perspective of the second actor 122. That is, the processor 102 may determine predicted actions of the first actor 120 and the agent 110 from the perspective of the second actor 122 and may determine the first order predicted action 324 of the second actor 122 based on the predicted actions of the first actor 120 and the agent 110 as discussed above with respect to FIG. 3C. In other words, the processor 102 may determine the actions 322, 326 as may be predicted by the second actor 122.

At block 408, the processor 102 may apply a second order reinforcement learning model on the first actor 120 to determine a second order predicted action 126 of the first actor 120. As discussed herein, the second order reinforcement learning model may use a predicted reward of the first order predicted action 324 of the second actor 122 to determine the second order predicted action 126 of the first actor 120. The processor 102 may determine the second order predicted action 126 through implementation of a selected candidate model as discussed herein. For instance, the processor 102 may determine the second order predicted action 126 of the first actor 120 by determining the second order predicted action 126 to be an action that optimizes a reward determined through application of the second order reinforcement learning and an analysis of the accessed data about the environment 130. In addition, the processor 102 may determine the second order predicted action 126 of the first actor 120 by determining the second order predicted action 126 through analysis of first order predicted actions 324, 326 of the second actor 122 and the agent 110. That is, the processor 102 may predict actions of the second actor 122 and the agent 110 and may determine the second order predicted action 126 of the first actor 120 based on the first order predicted actions 324, 326 of the second actor 122 and the agent 110.

At block 410, the processor 102 may apply a third order reinforcement learning model on the agent 110 to determine an action 132 that the agent 110 is to perform. The third order reinforcement learning model may use a predicted reward of the second order predicted action 126 to determine the action 132 that the agent 110 is to perform. As discussed herein, the third order reinforcement learning model may use a predicted reward of the second order predicted action 126 to determine the action 132 that the agent 110 is to perform. The processor 102 may determine the action 132 through implementation of a model as discussed herein. For instance, the processor 102 may determine the action 132 of the agent 110 by determining the action 132 to be an action that optimizes a reward determined through application of the third order reinforcement learning and an analysis of the accessed data about the environment 130. In addition, the processor 102 may determine the action 132 that the agent 110 is to perform by determining the action 132 through analysis of second order predicted actions 126, 128 of the second actor 122 and the first actor 120. That is, the processor 102 may determine second order predicted actions 126, 128 of the second actor 122 and the first actor 120 and may determine the action 132 that the agent is to perform based on the determined second order predicted actions 126, 128 of the second actor 122 and the first actor 120 as discussed herein with respect to FIG. 3C.

According to examples, the processor 102 may simulate multiple candidate actions of the agent 110, e.g., via implementation of Monte Carlo simulations, and may select an action that is predicted to result in an optimal result as the action 132 that the agent 110 is to perform. The action that is predicted to result in the optimal result may be, for instance, the action that results in a highest reward among the candidate actions of the agent 110.

At block 412, the processor 102 may cause, e.g., instruct, the agent 110 to perform the determined action 132. As discussed herein, the processor 102 the processor 102 may control the agent 110 to perform the determined action 132 and/or communicate an instruction to the agent 110 to perform the determined action 132.

Turning now to FIG. 5, at block 502, the processor 102 may access data about an environment 130 of an agent 110 in a manner similar to any of those discussed above with respect to block 402. At block 504, the processor 102 may identify a first actor 120 and a second actor 122 in the environment 130 in a manner similar to any of those discussed above with respect to block 402.

At block 506, the processor 102 may apply a first order reinforcement learning model on the second actor 122 to determine a first order predicted action 324 of the second actor 122. In addition, at block 508, the processor 102 may apply a second order reinforcement learning model on the first actor 120 to determine a second order predicted action 126 of the first actor 120. The operations in blocks 506 and 508 may be similar to blocks 406 and 408 discussed herein with respect to FIG. 4.

At block 510, the processor 102 may apply a first order reinforcement learning model on the first actor 120 to determine a first order predicted action 322 of the first actor 120. The processor 102 may determine the first order predicted action 322 through implementation of a selected candidate model as discussed herein. For instance, the processor 102 may determine the first order predicted action 322 of the first actor 122 by determining the first order predicted action 322 to be an action that optimizes a reward determined through application of the first order reinforcement learning and an analysis of the accessed data about the environment 130. In addition, the processor 102 may determine the first order predicted action 322 of the first actor 120 by determining the first order predicted action 322 through analysis of a predicted action of the second actor 122 and the agent 110 from the perspective of the first actor 120. That is, the processor 102 may determine predicted actions of the second actor 122 and the agent 110 from the perspective of the first actor 120 and may determine the first order predicted action 322 of the first actor 120 based on the predicted actions of the second actor 122 and the agent 110 as discussed above with respect to FIG. 3C. In other words, the processor 102 may determine the actions 324, 326 as may be predicted by the first actor 120.

At block 512, the processor 102 may apply a second order reinforcement learning model on the second actor 122 to determine a second order predicted action 128 of the second actor 122. As discussed herein, the second order reinforcement learning model may use a predicted reward of the first order predicted action 322 of the first actor 120 to determine the second order predicted action 128 of the second actor 122. The processor 102 may determine the second order predicted action 128 through implementation of a selected candidate model as discussed herein. For instance, the processor 102 may determine the second order predicted action 128 of the second actor 122 by determining the second order predicted action 128 to be an action that optimizes a reward determined through application of the second order reinforcement learning and an analysis of the accessed data about the environment 130. In addition, the processor 102 may determine the second order predicted action 128 of the second actor 122 by determining the second order predicted action 128 through analysis of first order predicted actions 322, 326 of the first actor 120 and the agent 110. That is, the processor 102 may predict actions of the first actor 120 and the agent 110 and may determine the second order predicted action 128 of the second actor 120 based on the first order predicted actions 322, 326 of the first actor 120 and the agent 110.

At block 514, the processor 102 may apply a third order reinforcement learning model on the agent 110 to determine an action 132 that the agent 110 is to perform. The third order reinforcement learning model may use a predicted reward of the second order predicted actions 126, 128 of the first actor 120 and the second actor 122 to determine the action 132 that the agent 110 is to perform. As discussed herein, the third order reinforcement learning model may use a predicted reward of the second order predicted actions 126, 128 to determine the action 132 that the agent 110 is to perform. The processor 102 may determine the action 132 through implementation of a model as discussed herein. For instance, the processor 102 may determine the action 132 of the agent 110 by determining the action 132 to be an action that optimizes a reward determined through application of the third order reinforcement learning and an analysis of the accessed data about the environment 130.

At block 516, the processor 102 may instruct the agent 110 to perform the determined action 132. In addition, or alternatively, the processor 102 may upload the determined action 132 that the agent 110 is to perform to a server, e.g., the server 140, via the network 150.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 6:
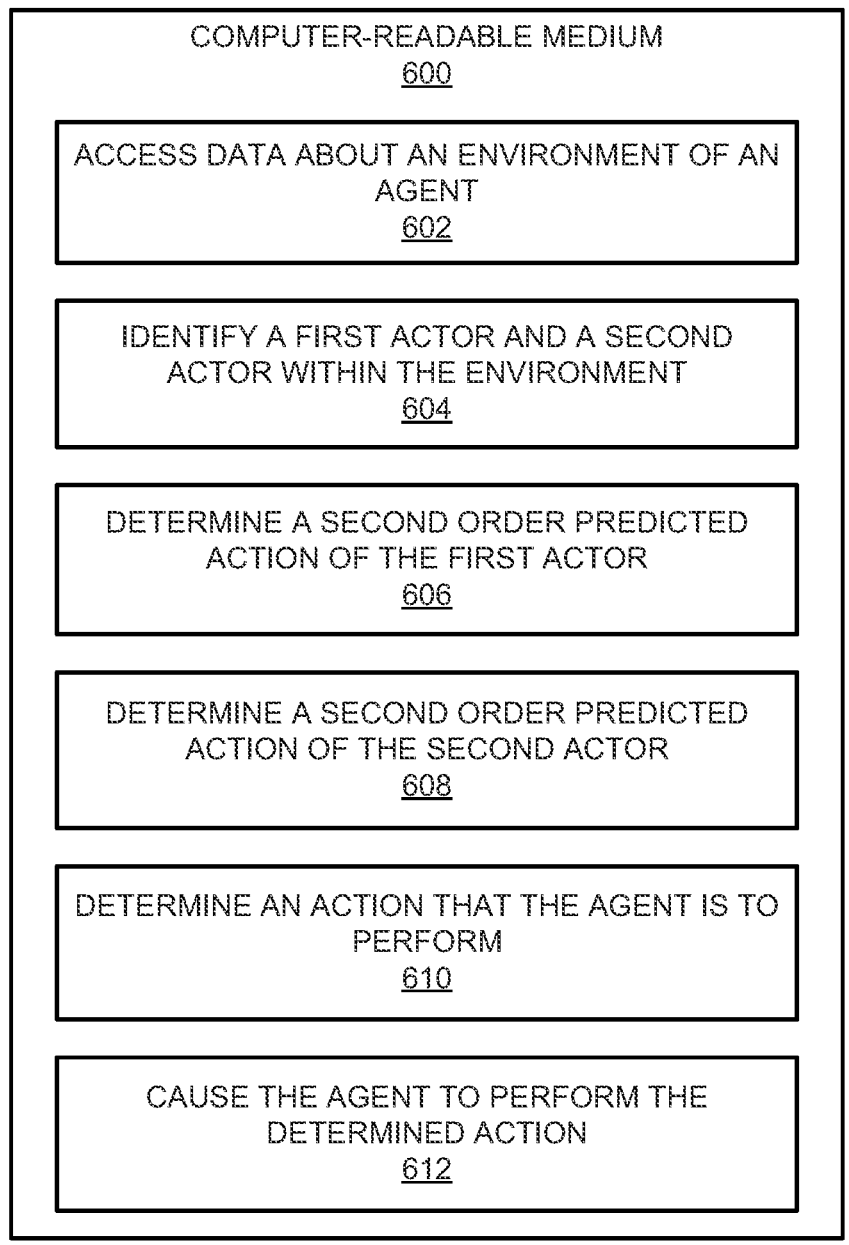
FIG. 6 depicts a block diagram of a computer-readable medium that may have stored thereon computer-readable instructions for determining an action that an agent is to perform using predicted actions of a first actor and a second actor, in accordance with an embodiment of the present disclosure.

Turning now to FIG. 6, there is shown a block diagram of a computer-readable medium 500 that may have stored thereon computer-readable instructions for determining an action 132 that an agent 110 is to perform using predicted actions of a first actor 120 and a second actor 122, in accordance with an embodiment of the present disclosure. It should be understood that the computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 may have stored thereon machine-readable instructions 602-610 that a processor, such as the processor 102 depicted in FIGS. 1 and 2, may execute. The computer-readable medium 600 may be an electronic, magnetic, optical, or other physical storage device that contains or stores executable instructions. The computer-readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to access data 116 about an environment 130 of an agent 110. The processor may access the data 116 in any of the manners discussed herein.

The processor may fetch, decode, and execute the instructions 604 to identify a first actor 120 and a second actor 122 within the environment 130. The processor may fetch, decode, and execute the instructions 606 to determine a second order predicted action 126 of the first actor 120, in which the first order predicted action 324 of the second actor 122 and a first order predicted action 326 of the agent 110 may be used as factors in determining the second order predicted action 126 of the first actor 120. The processor may fetch, decode, and execute the instructions 608 to determine a second order predicted action 126 of the second actor 122, in which the first order predicted action 322 of the first actor 120 and a first order predicted action 326 of the agent 110 may be used as factors in determining the second order predicted action 128 of the second actor 122. The processor may fetch, decode, and execute the instructions 610 to determine an action 132 that the agent 110 is to perform using the second order predicted action 126 of the first actor 120 and the second order predicted action 128 of the second actor 122 as factors. The processor may fetch, decode, and execute the instructions 612 to cause the agent 110 to perform the determined action 132.

As discussed herein, the processor may implement a recursive reinforcement learning model to determine the action 132 that the agent 110 is to perform. As also discussed herein, the processor may simulate outcomes of multiple candidate actions that the agent 110 is to perform and may select an action that is predicted to result in an optimal reward for the agent 110 as the action that the agent 110 is to perform.

In some examples, the processor may determine the first order predicted action 322 using both the first order predicted action 324 of the second actor 122 and a first order predicted action 326 of the agent 110 from a perspective of the first actor 120. That is, the processor may predict how the first actor 120 may predict the action of the second actor 122 and the action of the agent 110. For instance, the processor may apply a first order model of the second actor 122 to predict the first order predicted action 324 of the second actor 122 and another first order model of the agent 110 to predict the first order predicted action 326 of the agent 110, in which the first order models are from the perspective of the first actor 120. In addition, the processor may input the predicted actions of the second actor 122 and the agent 110 into a second order model of the first actor 120. The processor may also determine the second order predicted action 126 through implementation of the second order model of the first actor 120.

In addition or in other examples, the processor may determine the second order predicted action 128 using both the first order predicted action 322 of the first actor 120 and a first order predicted action 326 of the agent 110 from a perspective of the second actor 122. That is, the processor may predict how the second actor 122 may predict the first order predicted action 322 of the first actor 120 and the first order predicted action 326 of the agent 110. For instance, the processor may apply a first order model of the first actor 120 to predict the first order predicted action 322 of the first actor 120 and another first order model of the agent 110 to predict the first order predicted action 326 of the agent 110, in which the first order models are from the perspective of the second actor 122. In addition, the processor may input the first order predicted actions 322, 326 of the first actor 120 and the agent 110 into a second order model of the second actor 122. The processor may also determine the second order predicted action 128 through implementation of the second order model of the second actor 122.

Figure 7:
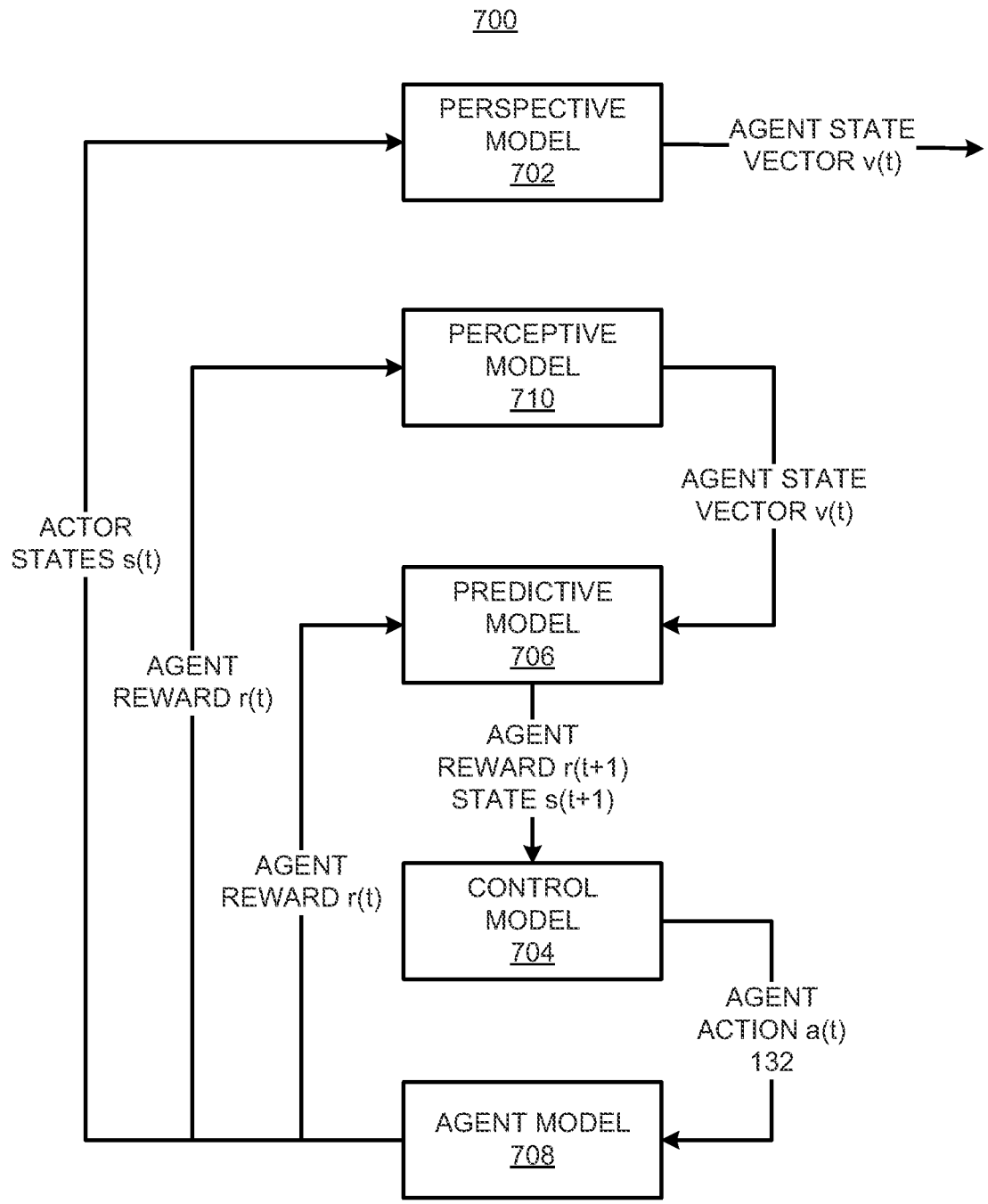
FIG. 7 depicts a diagram of a reinforcement learning model according to an embodiment of the present disclosure.

Reference is now made to FIG. 7, which depicts a diagram 700 of a reinforcement learning model according to an embodiment of the present disclosure. It should be understood that the diagram 700 depicted in FIG. 7 may include additional elements and that some of the elements described herein may be removed and/or modified without departing from the scope of the diagram 700 disclosed herein.

As shown in FIG. 7, the processor 102 may implement a multi-part reinforcement learning model for the agent 110. The multi-part reinforcement learning model may include a perceptive model 710 that may incorporate inputs from the agent's 110 environment 130 as well as a reward feedback and predicted control actions from a control model 704. As discussed herein, the sensory input may be snapshots, which may be referenced as frames, e.g., which may also be analogous to a video input frame and simultaneously concurrent input from other input sensors at that time. The processor 102 may record input sequentially as frames and the perceptive model 710 may be an autoencoder, which may concurrently be trained on a predictive model 706.

The predictive model 706 may attempt to predict the next frame, using a long short-term memory (LSTM) or similar recurrent model. In some examples, the predictive model may be run iteratively on output of the predictive model 706. This may be construed as an imagination mode, in the sense that the predictive model 706 may simply be imagining what might occur next.

The third model may be construed as the control model 704, which may be a simple (and much smaller) reinforcement learning model, which may try to maximize the reward based on a reward policy. The output of the control model 704 may be the action 132 that the agent 110 is to perform, which may correspond to direct outputs to the agent's 110 motors and/or other control mechanisms. Conveniently, the output of the predictive model 706 may include an expected reward, which may allow the predictive model 706 to be run on a number of "what if" scenarios to try to predict the expected reward from various actions.

The fourth model may be construed as the perspective model 702, which may also be based on the predictive model 706. The perspective model 702 may predict the sensory input from another perspective in the environment 130. This may allow the perspective model to attempt to predict what other actors 120, 122 might see, or otherwise detect from their respective sensors.

The fifth model may be construed as the agent model 708, which may be responsible for modeling and predicting the behavior of the actors 120, 122 in the environment 130. The agent model 708 may be designed to model and represent how the processor 102 is making its decisions for the agent 110. The agent model 708 may take many different forms, but in its most general form, the agent model 708 may contain a duplicate of all the major elements of a full model. The agent model 708 may be a second order model and may include a perceptive model, a predictive model, a control model, a perspective model, and even agent models representing the other actors 120, 122. However, to avoid an infinite recursion, these second order agent models, while they may also include the same decision making processes of the primary model, may not include third order agent models again representing the other agents. The second order agent models may include only perceptive, predictive, and control models.

The perceptive model 710 may produce an autoencoder vector (agent state vector v(t)) by synthesizing the sensory input, a prediction of a reward feedback, and also a prediction of the control model 704 output. In other words, the perceptive model 710 may encode the images collected by the sensor 114 of the agent 110, what current control state is in terms of where the agent 110 is going, and an expected reward for the current conditions. So, for instance, if the agent 110 were at the edge of a cliff, and the control output has all of the wheels moving full speed ahead, the "next frame" would be the agent 110 falling off the cliff, and a large negative reward, assuming that the agent 110 were programed by a reward policy not to reward the agent 110 for driving off a cliff.

In some examples, a perceptive vector (agent state vector v(t)) may be sufficiently large to incorporate not only the visual and other sensory inputs, but also a cognitive interpretation of things going on in the environment 130, in particular recognition of specific actors 120, 122 in the environment 130. Also, the perceptive vector may include encoding of some objects in the images that the sensor 114 may have collected in previous frames, and an overall perception of the environment 130. By way of example in which the agent 110 is a robot that is learning to navigate a maze, the perceptive vector may encode in some way the entire maze, such that the processor may make some intelligent predictions about how to navigate the maze. In other words, the whole perceptive vector may encode a complete representation of the robot's knowledge of the world, including things that the robot may not currently see, but may have seen in previous frames.

This feature of the perceptive model 710 may allow additional extrapolation from the perceptive vector to produce sensory input from a different perspective, for example 3 feet in front of the robot but facing the other way. To optimize training of the perspective model 702, the processor 102 may sense spatial data, which may optimally be recorded using a stereo camera input configuration, e.g., of the sensor 114. Training may be optimized by having multiple cameras in different angles, including side and rear view cameras, as well as stereo vision to allow the robot to see and encode distance to objects.

The predictive model 706 may concurrently be trained with the perceptive model 710 using, for instance, an LSTM, to try to predict the next frame of sensory input from the perceptive model 710. The predictive model 706 may be trained on a sequence of output vectors of the perceptive model 710 and may learn to predict the behavior of a complex environment, so the output vector of the predictive model 706 may also have high dimension, to encode the vast complexity of this environment. The predictive model 706 may learn the rules of the environment to predict the outcome of certain actions as well as anticipating what will happen next independently of the agent's 110 own action.

The predictive model 706 may not be given the role of predicting what the actors 120, 122 may do. Instead, that may be the role of the agent model 708. By way of example, the agent model 708 may encode the model template for each actor 120, 122 in the agent's 110 environment 130. That template may be used to run an independent model for each actor 120, 122 in the agent's 110 environment 130. The template may encode a variety of different behavioral models, which may be assumed to be similar in structure to the multiple models used to control the agent 110. As such, a model may be generated and assigned to each actor 120, 122, and the outputs of those models, for instance, in the form of predictions of what those actors 120, 122 will do, may be used as an input to the predictive model 706 for the agent 110. In addition, the complex behavior of the actors 120, 122 in the agent's 110 environment may collectively be taken as an input to the predictive model 706 of the agent 110. As a result, the predictive model 706 may predict the output of the next frame of the perceptive model 710, given the expected actions as predicted by the agent model 708 for each actor 120, 122 in the agent's 110 environment.

For example, if the agent 110 is facing an actor 120, there may be an agent model 708 assigned to that actor 120. The agent model 708 may predict that the actor 120 is going to turn right, and that prediction may be an input into the predictive model 706 for the agent 110. As such, the predictive model 706 may simply attempt to predict what the agent 110 is going to see in the next frame, given the agent model 708 for the actor 120 is predicting it is going to turn to the right. In other words, the predictive model 706 may predict what happens next given the anticipated behavior of the actor 120.

The control model 704 may take as an input the current output of the perceptive model 710, together with the output from the predictive model 706 not only for the next frame, but also for a variety of expected future frames. The control model 704 may use a Monte Carlo simulation, as well as the perceptive model's 710 output at several points in the past, so that the control model 704 has a rich set of data for the current predictions. The control model 704 may then be trained using a reinforcement learning algorithm to try to maximize the reward given a reward policy. Due to the time sequence nature of the input to the control model 704, the control model 704 may be trained using a recurrent model analogous to an RNN or LSTM.

The perceptive model 710 may include encoded output form the agent model 708, so the input to the control model 704 may include a prediction of the behavior of one or more actors 120, 122 currently in the agent's 110 environment 130, even potentially actors that are not visible in the current frame, but may be visible in future or previous frames. As a result, the control model 704 may make decisions based on predictions of the behavior of other actors 120, 122, using behavioral models customized to each of the actors 120, 122.

The control model 704 may be optimized to run through a variety of possible, e.g., "what if" scenarios, to, for instance, enable the control model 704 to essentially learn "on the fly." The predictive model 706 may be continuously learning and being updated with new data, while at the same time being run forward a few seconds to try to predict what's coming next. The processing for the predictive model 706 may be done using cloud resources, e.g., the server 140, may perform the processing for executing the predictive model 706.

By way of particular example in which the predictive model 706 may have detected a large reward, either positive or negative, the control model 704 may cause the processor 102 to command the agent 110 to stop and may process the agent's 110 actions. The control model 704 may also be re-trained using a short term predictive model, and a new action planned to react to the reward. This may cause the processor 102 to determine actions of the agent 110 on the fly.

According to examples, the reinforcement learning architecture disclosed herein may allow the perceptive model 710 and the predictive model 706 to predict anticipated outcomes for a short time in the future. In other words, the perceptive model 710 and the predictive model 706 may predict what may happen. There are two ways in which may be applied. First, the processor 102 may consider what-if scenarios. In some cases, the processor 102 may constantly be running the predictive model 706 a few seconds into the future to anticipate the immediate consequences of the actions of the agent 110. This prediction may be run through the reward policy to predict or anticipate a positive or negative reward. Additionally, the predictive model 706 may include fuzzing using a Monte Carlo simulator, so that the predictive model 706 may predict not just one outcome but multiple likely scenarios. If the predictive model 706 predicts, or anticipates, a positive or negative reward a short time into the future, the processor 102 may pause, and may run more model simulations to establish a likely control policy that will result in a positive reward or avoid a negative reward. In other words, in an example in which the processor 102 determines that the agent 110 is about to bump into an object, the predictive model 706 may detect that action and the processor 102 may re-plan dynamically to avoid the action.

Second, the processor 102 may learn dynamically in the environment 130. This may be enhanced even more if the correct reward policies are applied to the control model 704, in particular to contradict negative behaviors that may particularly be unhelpful. For example, an agent's 110 model may end up exhibiting odd behavior, such that the agent 110 gets stuck in a corner, runs into a wall, extends an actuator into an obstacle, or in the worst case hurts a person or damages property. Correct application of sensor feedback, for example, collision sensors or tactile sensors, may apply a negative feedback loop. In this scenario, the processor 102 may run a series of Monte Carlo simulations using fuzzing of the predictive model 706, and then re-train the control model 704 to optimize the reward policy to extricate the agent 110 from being stuck. In other words, Monte Carlo simulations using the world model may be used for limited problem solving capability. By running a series of simulated futures, the processor 102 may find a future in which the agent 110 gets unstuck, and then re-train the control model 704 using this data to get out of whatever situation it has become stuck in, or in some cases avoid getting into the stuck position in the first place, because the processor 102 may also be running this simulation into the future and potentially identify a negative outcome before it happens.

The perspective model 702 may allow the processor 102 to make predictions of what the agent 110 may see from another perspective location. Training the perspective model 702 to make these types of predictions may be performed by accumulating sensory input over time and as the agent 110 explores the environment 130. For instance, the agent 110 may accumulate sensory data from many locations in the environment 130. At some point in the future, or the past, the agent 110 may be in another position in the environment 130. This data may be used to train the perspective model 702, which may allow the perceptive model 710 to form an internal map of the environment 130. After accumulating sufficient input, the processor 102 may determine, for example, after turning a certain corner in a maze environment, the processor 102 may determine what was "behind" the agent 110 because the agent 110 had been there previously, and also had previously been through this junction in both directions multiple times. This may be construed as a spatial awareness model in the agent 110. The spatial awareness model may be trained by integrating many input frames over time as the agent 110 explores the environment 130. Also, to optimize training of the perspective model 702, the agent's 110 reward policy may be optimized for curiosity or exploration behavior in the agent 110, so that the agent 110 may explore a new environment to accumulate data to train the perspective model 702, and indirectly the perceptive model 710, which may ultimately encode this data.

Another way to understand the structure of the predictive model 706 for the processor 102 is as a matryoshka model. In a sense, the predictive model 706 may be construed as three predictive control models nested within one another. The inner model is a basic perceptive/predictive/control model, which may be referred to as a world model. The inner model may have the ability to make predictions, dream, or imagine, and make control decisions based on these predictions, as well as the past history of observations. The second layer is similar, but adds an inner perceptive/predictive/control world model to try to predict the behavior of other actors identified by the perceptive model 710. The perceptive model 710 may add the perspective to try to predict what the perceptive model 710 would be providing from the other actor's perspective. And, the agent model 708 in this case is may use the perceptive/predictive/control world model of the inner model. The third layer is again similar to the second layer, except in this case the inner model, e.g., the agent model 708, may be the complete second layer as just described. The third layer is the actual model that the processor 102 may use, using the second layer inner model as the agent model 708 for the other actors the processor 102 identifies, and in that model, the processor 102 may use a perceptive/predictive/control world model as the agent model 708. As a result, the predictive model 706 may be like a matryoshka doll, e.g., three models wrapped within each other, each making predictions based on what the model learns from the inner model.

As discussed herein, the processor 102 may identify multiple actors 120, 122 in the environment 130, which the processor 102 may collectively encode as an agent vector. The agent vector may be trained to encode a list of actors 120, 122, including a best guess at the policies respectively controlling the actors 120, 122 and their perspectives of the perception vector. The agent vector may be sufficient to predict the behavior in terms of control output for each actor 120, 122 in the agent's 110 environment 130. There may be at any given time multiple actors 120, 122 in the environment 130, encoded using a recurrent model which will output the next actor given a list of previous actors, until the recurrent model reaches the last actor, in which case the recurrent model may output a terminator agent vector. This may be analogous to the way a character based RNN outputs a word as a sequence of characters, with a stop character at the end of the word.

Each individual agent model 708 may take many different forms, depending on what kind of actor the agent model it is trying to model. However, in the simplest case, the agent model may be modeling another actor which is using the same method to model the behavior of all the other actors as well. In this general form, the agent model may include its own perceptive, predictive, control, and agent models. In addition, the second order agent model, the representation of other agents in the other actors may contain a perspective, predictive, and control model, e.g., without an agent model.

The agent model 708 may accommodate multiple model templates for different classes of actors 120, 122 that the agent model 708 may identify. However, this may become a sequence of agent models that may ultimately be accumulated into a uniform autoencoder output vector. For this reason, the output of the individual agent models may be uniform, so that the individual agent models may be combined uniformly. The output may be generic, including predicted actions such as rotation and motion in all directions, including vertical for agents which may be capable of independent vertical movement, and/or the like. The uniform autoencoder output vector may also include predictions of relative motion. In addition, behavior for a short period of time into the future may be predicted, which may either be a fixed sequence of repeated action and motion vectors, or the same vector autoencoded into a smaller vector, that may semantically express ideas, such as, for instance, the actor will move forward three feet, stop, then turn to the left.

According to examples, the agent vector may be an autoencoded expression of the actor's intention, a kind of model specific short term memory, which may be passed into the model for repeated iterations. This may allow the primary model to essentially play forward what the other actors may be planning to do over an indefinite time period.

In some examples, the agent model predictions may not predict a single specific outcome. Instead, each of the agent models 708 may estimate a range of different actions with different levels of confidence, for instance, through implementation of a Monte Carlo simulation. By way of example, the Monte Carlo simulation may simulate small random variations in both the model and the inputs, and then, using a clustering algorithm to both group the outcomes and then count the similar outcomes in each cluster. The mean outcome of each cluster may be taken as a representative sample, and then the probability of that outcome may be taken proportional to the counts of each outcome. Alternately, a predictive model 706 may be used that predicts a range of outcomes with different probabilities. In either of these examples, the output from the individual agent models 708 may be a range of possible actions together with the likelihood of each action, in descending likelihood.

In some examples, the agent models 108 may not be limited to actors that are automated. Instead, a similar model may be applied to persons, animals, or non-automated machines. For people or animals, an agent model 108 that may essentially be identical to the agent model for a robot may provide a crude but adequate simulation. In other words, it may not necessarily be important to model people and machines separately. A simplifying assumption may be made that all intelligent agents make decisions with the same simple model.

In some examples, the processor 102 may be connected to a global cloud-based data repository and learning service, which may, for instance, include the server 140. In these examples, observations may be gathered to continuously re-train global perceptive, perspective, predictive, control, and agent models. As these models are re-trained in real time, the processor 102 may update its models to reflect the most current data. The cloud service may also employ the feature of the predictive model 706 that may allow the predictive model 706 to re-play hypothetical scenarios, extrapolate into the future, and use this training data to refine the control models 704. The cloud service may also help the processor 102 fit the most likely agent models 708 to specific objects in the real world. For example, the agent models 708 may find not only that a general class of objects, for example red cars, behave in a certain way, for example they tend to drive fast and make risky decisions. The agent models 708 may also make generalizations about specific objects, for example the red car which pulls out of a specific driveway each morning at a specific time. The cloud service may learn that that particular vehicle behaves in a specific way, and makes specific decisions. The cloud service may share this information globally, for instance, across all processors that may access the cloud service for the models. The cloud service may also correlate specific data, for example on a specific day a specific red car might already have driven out of a specific driveway, so that other agents 110 that may pass the same driveway later in the day may make different assumptions about what may occur, specifically that that red car has already left and is not likely to come out of the driveway again that morning. The cloud service may share these observations globally to thereby connect all of the processors, e.g., agents, which connect to the cloud service.

According to examples, certain data collected by the agent 110 may be deleted, censored, redacted, and/or be able to train the models on that certain data in such a way that may guarantee a certain level of privacy, such as using differential privacy. This may be optional and configurable, and may also comply with privacy regulations. For example, the processor 102 may be prevented from using facial recognition if such use is either a violation of law or a person's privacy.

An example of the present disclosure is provided in which the agent 110 is a self-driving car approaching an intersection at which a pedestrian is waiting to cross at a cross walk. In this example, the agent 110 may stop to allow the pedestrian to cross only if the processor 102 is aware that the pedestrian is aware of the agent 110. In other words, the processor 102 may be able to model the pedestrian's behavior, and identify that circumstances that are preventing the pedestrian from crossing at the intersection involve the agent 110 itself. That is, the processor 102 may be aware that the agent 110 approaching the intersection may be the reason the pedestrian is waiting to cross. This awareness may allow the processor 102 to make a determination to change the action 132 of the agent 110 to modify the action of another actor. In other words, the processor 102 may determine that the agent 110 is to stop prior to the intersection to allow the pedestrian to cross. This behavior may not arise as an outcome of any other behavioral model that does not include this awareness.

Another way to describe this behavioral pattern is to say the processor 102 may empathize with other actors. More explicitly, the processor 102 may infer what these actors' goals are by creating a machine learning model for the actors' behaviors. A result of this empathy is that the processor 102 may choose to facilitate the other actor in achieving the goals of the agent 110. In this example, the processor 102 may facilitate the pedestrian crossing the street by stopping the agent 110 to allow the pedestrian to pass. The specific mechanism by which the processor 102 may make a decision to facilitate the action of other actors may be programmed in to the processor 102, either in the form of a reward mechanism in the processor's 102 control model, or through explicit programming. Such supplemental programing may have been determined at the time the agent 110 was designed. The contrary may also be indicated, where a processor 102 may identify an actor the processor 102 wishes to prevent form achieving the actor's goal, for example, preventing an intruder from breaking and entering in the case of a security robot, or other similar scenario.

An example of the present disclosure is provided in which the agent 110 is a virtual agent that may react to decisions made by non-robotic actors. For instance, the agent 110 may be a virtual teammate in a video game or other simulation. In most simulations, artificial intelligence (AI) controlled actors may all be controlled by a single AI. The controlled actors may all interact with each other because a single program is orchestrating and coordinating the behaviors of the actors. However, it is not possible to predict the behaviors of human actors in the simulation. And, if there are multiple human actors in a multi user simulation, predicting the actions of all the human actors, how they react to the actions of other human actors, or how they react to the actions of virtual agents, is normally considered a very hard problem.

However, using the models described herein, each virtual agent may create a model to try to identify the goals of each actor, human or virtual. For human actors, the model may try to estimate what the goals are, and then may build a pre-trained model optimized for those goals. However, the pre-trained model used to predict the human actor's behavior may also use a model that may incorporate predictions of other virtual agents as well as other human actors. This model may produce a high fidelity prediction of both human and virtual actors in the simulation. The result may be a virtual agent that may interact with, either cooperatively or adversarially, multiple simultaneous human and virtual actors.

By way of particular example, a video game may include two teams, a red team and a blue team and each team may have one human actor and one virtual (or AI) actor. In this example, the red team human actor may be about to throw a grenade and both the virtual actors in the red and blue teams, may also model the behaviors of all the other actors, both human and virtual. The red team virtual agent may predict that the red human actor is going to throw a grenade. Simultaneously, however, the red team virtual agent may make a prediction for the reaction of both of the blue team actors. The blue team virtual agent may do the same thing, which may allow the blue team virtual agent to make an action plan based on what the blue team virtual agent has determined what the blue team human actor is going to do, as well as a prediction for both red team actors. In this way, the virtual agents for both teams may make high fidelity predictions of all the actors and make action plans to cooperate naturally with their team mates as well as cooperatively attacking the opposite team.

An example of the present disclosure is provided in which the agent 110 is a robot designed to interact with humans in a natural way, e.g., as a helper, a toy, and/or the like. The processor 102 in this example may plan accurate actions for the agent 110 when the processor 102 has made some prediction about what other humans in its environment might be doing. This may be helpful because for a processor 102, human behavior is difficult to anticipate. As a result, robots may get in the way, get knocked over, or possibly collide with a person. Having a predictive model as disclosed herein to at least guess at what humans may do next may enable the processor 102 to operate accurately in these types of situations, especially in a situation where multiple human and perhaps multiple robot actors are interacting in the same environment.

An example of the present disclosure is provided in which the agent 110 is a robot that may see itself in a mirror or in an image captured by a video camera. In this example, the processor 102 may identify that the agent 110 has seen itself and may model the agent's 110 own behavior. Otherwise, the processor 102 may not know that this is some other robot behaving independently. In some examples, the processor 102 may have special programming to detect this case and resolve the paradox. In other examples, the processor 102 may identify the agent 110 in other ways, such as through a built in image recognition model and may identify itself visually. As a further example, the agent 110 may be equipped with a light that the agent 110 may blink on demand. In this example, the agent 110 may activate the light in a random pattern such that the processor 102 may know with certainty by the sequence of flashes that the agent 110 is looking at itself. In this case the processor 102 may substitute the control program for the predictive model to assign to the agent 110 it sees. In other words, the processor 102 may identify the agent 110 when the agent 110 sees itself and knows what the agent's 110 own actions will be.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine readable instructions that when executed cause the processor to:
access data about an environment of an agent;
identify a first actor in the environment from the accessed data;
access a first model that predicts a first action of the first actor;
apply the first model on the accessed data to determine a predicted action of the first actor in the environment;
determine an action that the agent is to perform in the environment based on the predicted action of the first actor; and
cause the agent to perform the determined action in the environment.

2. The apparatus of claim 1, wherein, to determine the action that the agent is to perform, the instructions, when executed, cause the processor to:
implement a recursive reinforcement learning model using the predicted action of the first actor to determine the action that the agent is to perform.

3. The apparatus of claim 1, wherein to determine the action that the agent is to perform, the instructions, when executed, cause the processor to:
determine the action that optimizes a reward for the agent according to a reward policy.

4. The apparatus of claim 1, wherein the instructions, when executed cause the processor to:
access images captured around the agent to access the data about the environment; and
apply a machine learning model on the accessed images to identify the first actor in the environment.

5. The apparatus of claim 1, wherein the instructions, when executed, cause the processor to:
identify a second actor in the environment from the accessed data;
access a second model that predicts a second action of the second actor;
apply the second model on the accessed data of the environment to determine a predicted action of the second actor in the environment; and
use the predicted action of the second actor as a factor in determining the predicted action of the first actor.

6. The apparatus of claim 1, wherein the instructions, when executed, cause the processor to:
identify a second actor in the environment from the accessed data;
access a second model that predicts a second action of the second actor;
apply the second model of the second actor as a first order reinforcement learning model on the accessed data to determine a predicted action of the second actor in the environment;
apply the first model of the first actor as a second order reinforcement learning model on the accessed data and the predicted action of the second actor to determine the predicted action of the first actor in the environment; and
apply a third order reinforcement learning model on the accessed data and the predicted action of the first actor to determine the action that the agent is to perform in the environment.

7. The apparatus of claim 6, wherein the instructions, when executed, cause the processor to:
upload the determined action that the agent is to perform to a server via a network, the server to update the third order reinforcement learning model.

8. The apparatus of claim 1, wherein the instructions, when executed, cause the processor to:
determine a plurality of candidate predicted actions of the first actor through application of the first model on the accessed data; and
based on the plurality of candidate predicted actions of the first actor, use a recursive reinforcement learning model to determine the action that the agent is to perform.

9. The apparatus of claim 1, wherein the instructions, when executed, cause the processor to:
simulate outcomes of candidate actions of the agent; and
select one of the candidate actions that is predicted to result in an optimal result as the action that the agent is to perform.

10. A method comprising:
accessing, by a processor, data about an environment of an agent;
identifying, by the processor, a first actor in the environment from the accessed data;
accessing, by the processor, a first model that predicts a first action of the first actor;
applying, by the processor, the first model on the accessed data to determine a predicted action of the first actor in the environment;
determining, by the processor, an action that the agent is to perform in the environment based on the predicted action of the first actor; and
causing, by the processor, the agent to perform the determined action in the environment.

11. The method of claim 10, wherein determining the action that the agent is to perform includes:
implementing a recursive reinforcement learning model using the predicted action of the first actor to determine the action that the agent is to perform.

12. The method of claim 10, wherein determining the action that the agent is to perform includes:
determining the action that optimizes a reward for the agent according to a reward policy.

13. The method of claim 10, further comprising:
accessing images captured around the agent to access the data about the environment; and
applying a machine learning model on the accessed images to identify the first actor in the environment.

14. The method of claim 10, wherein:
identifying a second actor in the environment from the accessed data;
accessing a second model that predicts a second action of the second actor;
applying the second model on the accessed data to determine a predicted action of the second actor in the environment; and
using the predicted action of the second actor as a factor in determining the predicted action of the first actor.

15. The method of claim 10, further comprising:
simulating outcomes of candidate actions of the agent; and
selecting one of the candidate actions that is predicted to result in an optimal result as the action that the agent is to perform.

16. The method of claim 10, further comprising:
identifying a second actor in the environment from the accessed data;

applying a second model of the second actor as a first order reinforcement learning model on the accessed data to determine a predicted action of the second actor in the environment;

applying the first model of the first actor as a second order reinforcement learning model on the accessed data and the predicted action of the second actor to determine the predicted action of the first actor in the environment; and applying a third order reinforcement learning model on the accessed data and the predicted action of the first actor to determine the action that the agent is to perform in the environment.

17. A non-transitory computer-readable medium on which is stored computer-readable instructions that when executed by a processor, cause the processor to:

access data about an environment of an agent;

identify a first actor in the environment from the accessed data;

access a first model that predicts a first action of the first actor;

apply the first model on the accessed data to determine a predicted action of the first actor in the environment;

determine an action that the agent is to perform in the environment based on the predicted action of the first actor; and cause the agent to perform the determined action in the environment.

18. The non-transitory computer-readable medium of claim 17, wherein the instructions, when executed, cause the processor to:

access images captured around the agent to access the data about the environment; and apply a machine learning model on the accessed images to identify the first actor in the environment.

19. The non-transitory computer-readable medium of claim 17, wherein the instructions, when executed, cause the processor to:

implement a recursive reinforcement learning model using the predicted action of the first actor to determine the action that the agent is to perform.

20. The non-transitory computer-readable medium of claim 19, wherein the instructions, when executed, cause the processor to:

identify a second actor in the environment from the accessed data;

access a second model that predicts a second action of the second actor;

apply the second model as a first order reinforcement learning model on the accessed data to determine a predicted action of the second actor in the environment;

apply the first model as a second order reinforcement learning model on the accessed data and the predicted action of the second actor to determine the predicted action of the first actor in the environment; and apply a third order reinforcement learning model on the accessed data and the predicted action of the first actor to determine the action that the agent is to perform in the environment.

\* \* \* \* \*